US011666885B2

(12) United States Patent
Marlin et al.

(10) Patent No.: US 11,666,885 B2
(45) Date of Patent: Jun. 6, 2023

(54) ADSORBENT PARTICLES AND METHODS OF FORMING THEREOF

(71) Applicant: Saint-Gobain Ceramics & Plastics, Inc., Worcester, MA (US)

(72) Inventors: Samuel Noel Patrice Marlin, Plan d'Orgon (FR); Samuel Morse Koch, Broadview Heights, OH (US); Jingyu Shi, Hudson, OH (US); Patrick Nguyen Van Nuoi, Vedène (FR); James A. McCarthy, Stow, OH (US); Stephen L. Dahar, Solon, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 139 days.

(21) Appl. No.: 16/856,117

(22) Filed: Apr. 23, 2020

(65) Prior Publication Data

US 2020/0338525 A1    Oct. 29, 2020

Related U.S. Application Data

(60) Provisional application No. 62/838,411, filed on Apr. 25, 2019.

(51) Int. Cl.
  *B01J 20/08*  (2006.01)
  *B01J 20/28*  (2006.01)
  *B01J 20/30*  (2006.01)

(52) U.S. Cl.
  CPC ......... *B01J 20/08* (2013.01); *B01J 20/28004* (2013.01); *B01J 20/28019* (2013.01); *B01J 20/3007* (2013.01)

(58) Field of Classification Search
  CPC .................. B01J 20/08; B01J 20/28004; B01J 20/28019; B01J 20/3007
  See application file for complete search history.

(56) References Cited

U.S. PATENT DOCUMENTS

| 9,200,187 | B2 | 12/2015 | Bauer et al. |
| 9,468,906 | B2 | 10/2016 | Baltes et al. |
| 9,688,893 | B2 | 6/2017 | Bauer et al. |
| 2016/0317998 | A1 | 11/2016 | Boualleg et al. |
| 2017/0043317 | A1 | 2/2017 | Boualleg et al. |
| 2018/0327644 | A1 | 11/2018 | Bauer et al. |
| 2018/0345244 | A1 | 12/2018 | Boualleg et al. |
| 2018/0353932 | A1 | 12/2018 | Boualleg et al. |
| 2019/0314784 | A1 | 10/2019 | Lecocq et al. |

FOREIGN PATENT DOCUMENTS

| CN | 1053634 A | * | 8/1991 | |
| CN | 1056364 A | | 8/1991 | |
| CN | 106507704 B | | 4/2010 | |
| CN | 104540639 A | | 4/2015 | |
| CN | 106102902 A | | 11/2016 | |
| CN | 108043358 A | | 5/2018 | |
| CN | 108187608 A | * | 6/2018 | ............ B01J 20/046 |
| CN | 108187608 A | | 6/2018 | |
| WO | 96/12915 A1 | | 5/1996 | |
| WO | 2005/052544 A2 | | 6/2005 | |
| WO | 2013177446 A1 | | 11/2013 | |
| WO | 2015097201 A1 | | 7/2017 | |

OTHER PUBLICATIONS

International Search Report from PCT Application No. PCT/US2020/029443 dated Aug. 12, 2020, 1 pg.

* cited by examiner

*Primary Examiner* — Yong L Chu
(74) *Attorney, Agent, or Firm* — Adrian Lawrence; Stewart A. Fraser

(57) ABSTRACT

A method of forming a batch of shaped adsorbent particles may include applying a precursor mixture into a shaping assembly within an application zone to form a batch of precursor shaped adsorbent particles, drying the batch of precursor shaped adsorbent particles within the shaping assembly to form the batch of shaped adsorbent particles, and ejecting the batch of shaped adsorbent particles from the shaping assembly. The batch of shaped adsorbent particles may have a moisture content of at least about 20 wt. %.

13 Claims, 4 Drawing Sheets

US 11,666,885 B2

ADSORBENT PARTICLES AND METHODS OF FORMING THEREOF

CROSS REFERENCE TO RELATED APPLICATION

This application claims the benefit of U.S. Provisional Application No. 62/838,411 filed Apr. 25, 2019.

FIELD OF THE INVENTION

The following is directed generally to adsorbent particles, and more particularly to lithium bayerite adsorbent particles and methods of making the same.

BACKGROUND

Adsorbent particles are commonly used as the solid portion of an adsorbent column and must be packed tightly to improve adsorbent kinetics within the column. Consistent shape and size of adsorbent particles used in an adsorbent column facilitate tighter packing density and, ultimately, improved performance of the adsorbent column. Accordingly, the industry continues to demand improved mass manufacturing of adsorbent particles that have controlled and consistent size and shape.

SUMMARY

According to a first aspect, a method of forming a batch of shaped adsorbent particles may include applying a precursor mixture into a shaping assembly within an application zone to form a batch of precursor shaped adsorbent particles, drying the batch of precursor shaped adsorbent particles within the shaping assembly to form the batch of shaped adsorbent particles, and ejecting the batch of shaped adsorbent particles from the shaping assembly. The batch of shaped adsorbent particles may have a moisture content of at least about 20 wt. %.

According to yet another aspect, a batch of shaped adsorbent particles may have an average particle diameter of not greater than about 5.0 mm and a particle aspect ratio (AR) distribution span PARDS of not greater than about 50%, where PARDS is equal to $(AR_{90}-AR_{10})/AR_{50}$, where $AR_{90}$ is equal to a $AR_{90}$ particle aspect ratio (AR) distribution measurement of the batch of shaped adsorbent particles, $AR_{10}$ is equal to a $AR_{10}$ particle aspect ratio (AR) distribution measurement of the batch of shaped adsorbent particles, and $AR_{50}$ is equal to a $AR_{50}$ particle aspect ratio (AR) distribution measurement of the batch of shaped adsorbent particles.

According to still another aspect, a system for forming a batch of shaped adsorbent particles may include an application zone comprising a shaping assembly, a drying zone and an ejection zone. The application zone may include a first portion having an opening and configured to be filled with a precursor mixture to form a batch of precursor shaped adsorbent particles, and a second portion abutting the first portion. The drying zone may include a first heat source and may be configured to dry the batch of precursor shaped adsorbent particles to form the batch of shaped adsorbent particles. The ejection zone may include an ejection assembly configured to eject the batch of shaped adsorbent particles from the shaping assembly.

According to a first aspect, a method of forming a batch of shaped lithium bayerite adsorbent particles may include applying a lithium bayerite precursor mixture into a shaping assembly within an application zone to form a batch of precursor shaped lithium bayerite adsorbent particles, drying the batch of precursor shaped lithium bayerite adsorbent particles within the shaping assembly to form the batch of shaped lithium bayerite adsorbent particles, and ejecting the batch of shaped lithium bayerite adsorbent particles from the shaping assembly. The batch of shaped lithium bayerite adsorbent particles may have a moisture content of at least about 20 wt. %.

According to yet another aspect, a batch of shaped lithium bayerite adsorbent particles may have an average particle diameter of not greater than about 5.0 mm and a particle aspect ratio (AR) distribution span PARDS of not greater than about 50%, where PARDS is equal to $(AR_{90}-AR_{10})/AR_{50}$, where $AR_{90}$ is equal to a $AR_{90}$ particle aspect ratio (AR) distribution measurement of the batch of shaped adsorbent particles, $AR_{10}$ is equal to a $AR_{10}$ particle aspect ratio (AR) distribution measurement of the batch of shaped adsorbent particles, and $AR_{50}$ is equal to a $AR_{50}$ particle aspect ratio (AR) distribution measurement of the batch of shaped adsorbent particles.

According to still another aspect, a system for forming a batch of shaped lithium bayerite adsorbent particles may include an application zone comprising a shaping assembly, a drying zone and an ejection zone. The application zone may include a first portion having an opening and configured to be filled with a precursor mixture to form a batch of precursor shaped adsorbent particles, and a second portion abutting the first portion. The drying zone may include a first heat source and may be configured to dry the batch of precursor shaped adsorbent particles to form the batch of shaped adsorbent particles. The ejection zone may include an ejection assembly configured to eject the batch of shaped adsorbent particles from the shaping assembly.

BRIEF DESCRIPTION OF THE DRAWINGS

The present disclosure can be better understood, and its numerous features and advantages made apparent to those skilled in the art by referencing the accompanying drawings.

Figure 1:
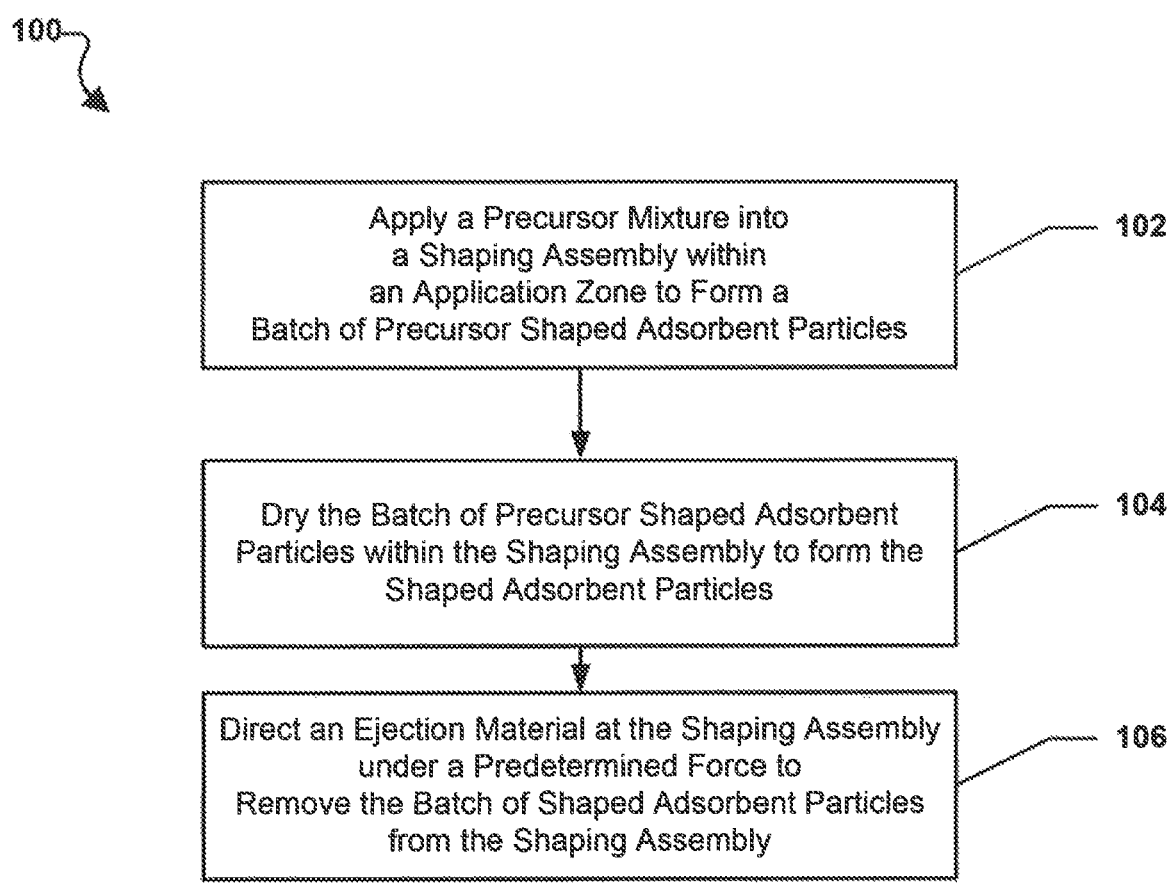
FIG. 1 is an illustration of a flowchart of a method of making a batch of shaped adsorbent particles in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

The use of the same reference symbols in different drawings indicates similar or identical items.

DETAILED DESCRIPTION

The following description, in combination with the figures, is provided to assist in understanding the teachings disclosed herein. The following discussion will focus on specific implementations and embodiments of the teachings. This discussion is provided to assist in describing the teachings and should not be interpreted as a limitation on the scope or applicability of the teachings.

The term "averaged," when referring to a value, is intended to mean an average, a geometric mean, or a median value. As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. As used herein, the phrase "consists essentially of" or "consisting essentially of" means that the subject that the phrase describes does not include any other components that substantially affect the property of the subject.

Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Further, references to values stated in ranges include each and every value within that range. When the terms "about" or "approximately" precede a numerical value, such as when describing a numerical range, it is intended that the exact numerical value is also included. For example, a numerical range beginning at "about 25" is intended to also include a range that begins at exactly 25. Moreover, it will be appreciated that references to values stated as "at least about," "greater than," "less than," or "not greater than" can include a range of any minimum or maximum value noted therein.

Embodiments described herein are generally directed to the formation of a batch of shaped adsorbent particles having generally uniform shape (i.e., aspect ratio) throughout the batch.

For purposes of embodiments described herein, adsorption is defined as the separation of adsorbate components of a gas or a liquid mixture by the transfer of one or more components to a surface of adsorbent particles. Adsorbent particles are defined as porous solid particles configured for, useful for, or directly applied for the uptake and immobilization of a species (e.g. a solid, a liquid, a gas, a molecule, an atom, or an ion) from a surrounding medium (e.g. a solid, a liquid, or a gas) by one or more adsorption processes including physisorption, chemisorption, intercalation, and ion exchange. The adsorbed components are held to the surface by intermolecular forces, including Van der Waals and electrostatic forces. The adsorbed components may be subsequently removed or desorbed allowing as a consequence the adsorbent, or adsorbent particles, to be reused and advantageously the adsorbed components to be recovered (and concentrated). The attractive forces in adsorption are typically weaker than those of chemical bonds. Therefore, desorption of the adsorbate can be achieved by overcoming the energy of the attractive forces such as by increasing the temperature, by reducing its partial pressure or concentration, or by displacing it with another adsorbate (this is in particular the case for ion exchange and can be named as an elution process).

Referring initially to a method of forming a batch of shaped adsorbent particle, FIG. 1 illustrates a shaped adsorbent particles forming process generally designated 100. Shaped adsorbent particles forming process 100 may include a first step 102 of applying a precursor mixture into a shaping assembly within an application zone to form a batch of precursor shaped adsorbent particles, a second step 104 of drying the batch of precursor shaped adsorbent particles within the shaping assembly to form the batch of shaped adsorbent particles and a third step 106 of ejecting the batch of shaped adsorbent particles from the shaping assembly.

Figure 2A:
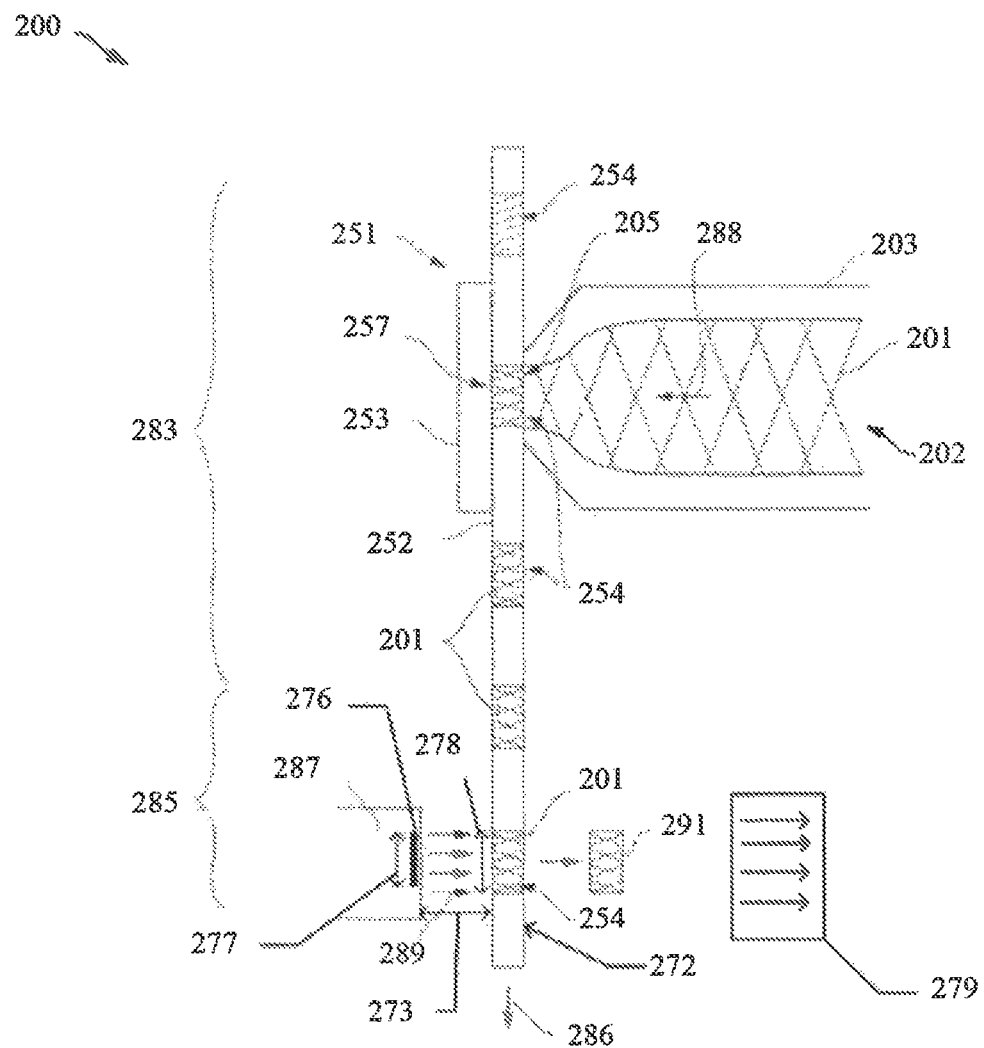
FIG. 2a includes a schematic of a system for forming a batch of shaped adsorbent particles in accordance with an embodiment.

FIG. 2a includes an illustration of a system that may be used in forming a batch of shaped adsorbent particles in accordance embodiments described herein. As illustrated, a system 200 may include a die 203 configured to facilitate delivery of a precursor mixture 201 contained within a reservoir 202 of the die 203 to a shaping assembly 251. It will be appreciated, that forming process 100 as outlined in FIG. 1, may be carried out, for example, using system 200 as shown in FIG. 2a, but is not limited to being carried out using system 200.

Referring specifically to FIG. 2a, according to particular embodiments, the precursor mixture 201 can be provided within the interior of the die 203 and configured to be extruded through a die opening 205 positioned at one end of the die 203. As further illustrated, extruding can include applying a force (or a pressure) on the precursor mixture 201 to facilitate extruding the precursor mixture 201 through the die opening 205. In accordance with an embodiment, a particular pressure may be utilized during extrusion. For example, the pressure can be at least about 10 kPa, such as, at least about 500 kPa, at least about 1,000 kPa, at least about 2,000 kPa, or even at least about 3,000 kPa. According to still other embodiments, the pressure utilized during extrusion may be not greater than about 10,000 kPa, such as, not greater than about 8,000 kPa, or even not greater than about 6,000 kPa. It will be appreciated that the pressure utilized during extrusion may be any value between, and including, any of the minimum and maximum values noted above. It will be further appreciated that the pressure utilized during extrusion may be within a range between, and including, any of the minimum and maximum values noted above.

As further illustrated in FIG. 2a, the system 200 can include a shaping assembly 251. According to certain embodiments, the shaping assembly 251 may include a first portion 252 and a second portion 253. Notably, within the applications zone 283, the first portion 252 can be adjacent to the second portion 253. In more particular instances, within the application zone 283, the first portion 252 can be abutting a surface 257 of the second portion 253. According to yet other embodiments, the system 200 can be designed such that a portion of the shaping assembly 251, such as the first portion 252, may be translated between rollers. The first portion 252 may be operated in a loop such that the forming process can be conducted continuously.

As further illustrated in FIG. 2a, the system 200 can include an application zone 283, including the die opening 205 of the die 203. According to yet other embodiments, the process can further include applying the precursor mixture 201 into at least a portion of the shaping assembly 251. In particular embodiments, the process of applying the precursor mixture 201 can include depositing the precursor mixture 201 via a process, such as, extrusion, molding, casting, printing, spraying, and a combination thereof. In still other embodiments, such as that illustrated in FIG. 2a, the precursor mixture 201 may be extruded in a direction 288 through the die opening 205 and into at least a portion of the shaping assembly 251. Notably, a least a portion of the shaping assembly 251 can include at least one opening 254.

In particular embodiments, such as that illustrated in FIG. 2a, the shaping assembly 251 can include a first portion 252 having an opening 254 configured to receive the precursor mixture 201 from the die 203.

In accordance with still other embodiments, the shaping assembly 251 can include at least one opening 254 that can be defined by a surface or multiple surfaces, including for example, at least three surfaces. In particular embodiments, the opening 254 can extend through an entire thickness of the first portion 252 of the shaping assembly 251. Alternatively, the opening 254 can extend through an entire thickness of the shaping assembly 251. Still, in other alternative embodiments, the opening 254 can extend through a portion of the entire thickness of the shaping assembly 251.

Figure 2B:
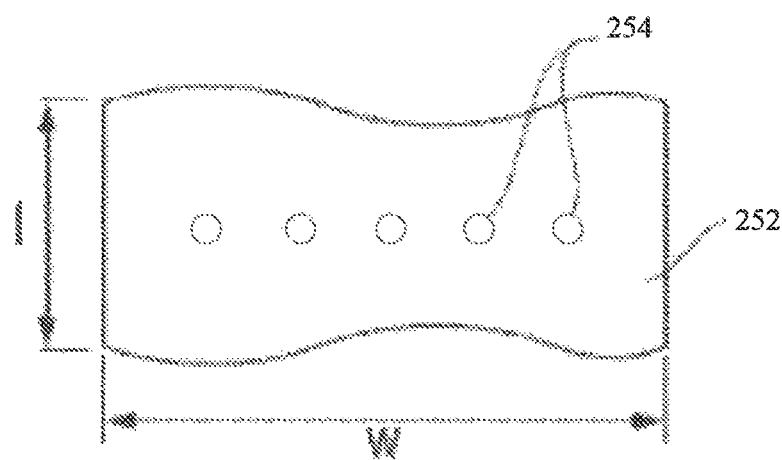
FIG. 2b includes an illustration of a portion of the system of FIG. 2a in accordance with an embodiment.

Referring briefly to FIG. 2b, a segment of a first portion 252 is illustrated. As shown, the first portion 252 can include an opening 254, and more particularly, a plurality of openings 254. The openings 254 can extend into the volume of the first portion 252, and more particularly, extend through the entire thickness of the first portion 252 as perforations. As further illustrated, the first portion 252 of the shaping assembly 251 can include a plurality of openings 254 displaced from each other along a length of the first portion 252. In particular embodiments, the first portion 252 may be translated in a direction 286 through the application zone 283 at a particular angle relative to the direction of extrusion 288. In accordance with an embodiment, the angle between the directions of translation 286 of the first portion 252 and the direction of extrusion 288 can be substantially orthogonal (i.e., substantially 90°). However, in other embodiments, the angle may be different, such as acute, or alternatively, obtuse.

In particular embodiments, the shaping assembly 251 can include a first portion 252 that may be in the form of a screen, which may be in the form of a perforated sheet. Notably, the screen configuration of the first portion 252 may be defined by a length of material having a plurality of openings 254 extending along its length and configured to accept the precursor mixture 201 as it is deposited from the die 203. The first portion can be in the form of a continuous belt that is moved over rollers for continuous processing. In certain embodiments, the belt can be formed to have a length suitable for continuous processing, including for example, at length of at least about 2 m, such as at least about 3 m.

In a particular embodiment, the openings 254 can have a two-dimensional shape as viewed in a plane defined by the length (l) and width (w) of the screen. While the openings 254 are illustrated as having a circular two-dimensional shape, other shapes are contemplated. For example, the openings 254 can have a two-dimensional shape such as polygons, ellipsoids, numerals, Greek alphabet letters, Latin alphabet letters, Russian alphabet characters, Arabic alphabet characters (or alphabet letters of any language), complex shapes including a combination of polygonal shapes, and a combination thereof. In particular instances, the openings 254 may have two-dimensional polygonal shapes such as, a triangle, a rectangle, a quadrilateral, a pentagon, a hexagon, a heptagon, an octagon, a nonagon, a decagon, and a combination thereof. Moreover, a first portion 252 can be formed to include a combination of openings 254 having a plurality of different two-dimensional shapes. It will be appreciated that the first portion 252 may be formed to have a plurality of openings 254 that may have different two-dimensional shapes as compared to each other.

In other embodiments, the shaping assembly 251 may be in the form of a mold. In particular, the shaping assembly 251 can be in the shape of a mold having openings 254 defining side surfaces and a bottom surface configured to accept the precursor mixture 201 from the die 203. Notably, a mold configuration may be distinct from a screen configuration such that the mold has openings that do not extend through the entire thickness of the shaping assembly 251.

In one design, the shaping assembly 251 can include a second portion 253 configured to be adjacent to the first portion 252 within the application zone 283. In particular instances, the precursor mixture 201 can be applied into the opening 254 of the first portion 252 and configured to abut a surface 257 of the second portion 253 within the application zone 283. For one particular design, the second portion 253 can be configured as a stop surface allowing the precursor mixture 201 to fill the opening 254 within the first portion 252.

According to one embodiment, the surface 254 of the second portion 253 can be configured to contact the precursor mixture 201 while it is contained within the opening 254 of the first portion 252. The surface 257 may have a particular coating to facilitate processing. For example, the surface 257 may include a coating including an inorganic material, an organic material, and a combination thereof. Some suitable inorganic materials can include a ceramic, a glass, a metal, a metal alloy, and a combination thereof. Certain suitable examples of an inorganic material can include a polymer, including for example, a fluoropolymer, such as polytetrafluoroethylene (PTFE).

Alternatively, the surface 257 may include features, including for example protrusions and grooves such that during processing the precursor mixture 201 contained within the opening 254 of the first portion 252 may replicate features contained on the surface 257 of the second portion 253.

As described herein, in particular embodiments, the first portion 252 may be translated in a direction 286. As such, within the application on 283, the precursor mixture 201 contained in the openings 254 of the first portion 252 may be translated over the surface 257 of the second portion 253. In accordance with an embodiment, the first portion 252 may be translated in a direction 286 at a particular rate to facilitate suitable processing. For example, the first portion 252 may be translated through the application zone 283 at a rate of at least about 0.5 mm/s. In other embodiments, the rate of translation of the first portion 252 may be greater, such as at least about 1 cm/s, at least about 3 cm/s, at least about 4 cm/s, at least about 6 cm/s, at least about 8 cm/s, or even at least about 10 cm/s. Still, in at least one non-limiting embodiment, the first portion 252 may be translated in a direction 286 at a rate of not greater than about 5 m/s, such as not greater than about 1 m/s, or even not greater than about 0.5 m/s. It will be appreciated that the first portion 252 may be translated at a rate within a range between any of the minimum and maximum values noted above.

After applying the precursor mixture 201 in the openings 254 of the first portion 252 of the shaping assembly 251, the first portion 252 may be translated to an ejection zone 285. Translation may be facilitated by a translator configured to translate at least a portion of the shaping assembly from the application zone 283 to the ejection zone 285. Some suitable examples of a translator may include a series of rollers, about which the first portion 252 may be looped and rotated around.

According to certain embodiments, ejection of the precursor mixture 201 in the ejection zone 285 may include any ejection process, such as, a vibrational ejection process, a mechanical ejection process, a chemical ejection process or any combination thereof.

According to one possible embodiments, the ejection zone 285 may include an ejection assembly 287 that can be configured to eject the precursor mixture 201 contained within the openings 254 of the first portion 252. In a particular embodiment, during the translation of the first portion 252 from the application zone 283 to the ejection zone 285, only a portion of the shaping assembly 251 may be moved. For example, the first portion 252 of the shaping assembly 251 may be translated in a direction 286, while at least the second portion 253 of the shaping assembly 251 may be stationary relative to the first portion 252. That is, in particular instances the second portion 253 may be contained entirely within the application zone 283 and may be removed from contact with the first portion 252 within the ejection zone 285. In particular instances, the second portion 253, which in certain embodiments may be alternatively referred to as the backing plate, terminates prior to the ejection zone 285.

The first portion 252 can be translated from the application zone 283 into the ejection zone 285, where opposing major surfaces of the precursor mixture 201 contained within the openings 254 of the first portion 252 may be exposed. In certain instances, exposure of both major surfaces of the precursor mixture 201 in the openings 254 can facilitate further processing, including for example, ejection of the precursor mixture 201 from the openings 254.

As further illustrated in the assembly 200, in particular embodiments, the first portion 252 of the shaping assembly 251 can be in direct contact with the second portion 253 of the shaping assembly 251 within the application zone 283. Moreover, prior to translating the first portion 252 from the application zone 283 to the ejection zone 285, the first portion 252 can be separated from the second portion 253. As such, the precursor mixture 201 contained within the openings 254 can be removed from at least one surface of a portion of the shaping assembly 251, and more particularly, the surface 257 of the second portion 253 of the shaping assembly 251. Notably, the precursor mixture 201 contained within the opening 254 can be removed from the surface 257 of the second portion 253 prior to ejection of the precursor mixture 201 from the openings 254 in the ejection zone 285. The process of removing the precursor mixture 201 from the first portion 252 of the shaping assembly 251 can be conducted after removing the second portion 253 from contact with the first portion 252.

In accordance with an embodiment, the precursor mixture 201 can experience a change in weight of less than about 60% for the total weight of the precursor mixture 201 for the duration the precursor mixture 201 is in the opening of the first portion 252 of the shaping assembly 251. In other embodiments, the weight loss of the precursor mixture 201 while it is contained within the shaping assembly 251 can be less, such as less than about 55%, less than about 50%, less than about 45%, less than about 40%, or even less than about 35%. According to still other embodiments, the weight loss of the precursor mixture 201 while it is contained within the shaping assembly 251 can be at least about 15%, such as, at least about 20% or at least about 25% or even at least about 30%.

Furthermore, during processing, the precursor mixture 201 may experience a change in volume (e.g., shrinkage) for the duration the precursor mixture 201 is in an opening 254 of the shaping assembly 251. For example, the change of volume of the precursor mixture 201 can be at least about 1% for the total volume of the precursor mixture 201 for the duration between applying the precursor mixture 201 in the opening and ejection of the precursor mixture from the opening 254, such as, at least about 3% or at least about 5% or at least about 10% or at least about 15% or at least about 20% or at least about 25% or at least about 30% or at least about 35% or at least about 40% or even at least about 45%. According to still other embodiments, the change of volume of the precursor mixture 201 can be less than about 60% for the total volume of the precursor mixture 201 for the duration between applying the precursor mixture 201 in the opening and ejection of the precursor mixture from the opening 254. In other embodiments, the total change in volume may be less, such as less than about 58%, less than about 55%, or even less than about 53%.

In accordance with an embodiment, the precursor mixture 201 may undergo a controlled heating process, while the precursor mixture is contained within the shaping assembly 251. For example, the heating process may include heating the precursor mixture at a temperature greater than room temperature for a limited time. The temperature may be at least about 25° C., such as at least about 30° C. or at least about 35° C., at least about 40° C., such as at least about 50° C., at least about 60° C., or even at least about 100° C. Still, the temperature may be not greater than about 300° C., such as not greater than about 200° C., or even not greater than about at least about 150° C., or even not greater than about 100° C. The duration of heating can be particularly short, such as not greater than about 10 minutes, not greater than about 5 minutes, not greater than about 3 minutes, not greater than about 2 minutes, or even not greater than about 1 minute.

The heating process may utilize a radiant heat source, such as infrared lamps to facilitate controlled heating of the precursor mixture 201. Moreover, the heating process may be adapted to control the characteristics of the precursor mixture and facilitate particular aspects of the shaped adsorbent particles according to embodiments herein.

In accordance with an embodiment, the process of ejecting the precursor mixture 201 from an opening 254 of the shaping assembly 251 can be conducted at a particular temperature. For example, the process of ejection can be conducted at a temperature of not greater than about 300° C. In other embodiments, the temperature during ejection can be not greater than about 250° C., not greater than about 200° C., not greater than about 180° C., not greater than about 160° C., not greater than about 140° C., not greater than about 120° C., not greater than about 100° C., not greater than about 90° C., not greater than about 60° C., or even not greater than about 30° C. Some suitable temperatures for conducting the ejection process can be at least about −80° C., such as at least about −50° C., at least about −25° C., at least about 0° C., at least about 5° C., at least about 10° C., or even at least about 15° C. It will be appreciated that in certain non-limiting embodiments, the process of ejecting the precursor mixture 201 from an opening 254 may be conducted at a temperature within a range between any of the temperatures noted above.

Moreover, the gap distance 273 between the surface of the ejection assembly 287 and the first portion 252 of the shaping assembly can be controlled to facilitate formation of shaped adsorbent particles according to an embodiment. The gap distance 273 may be modified to facilitate forming shaped adsorbent particles with certain features or limiting the formation of certain features.

It will further be appreciated that a pressure differential may be created on opposite sides of the first portion 252 of the shaping assembly 251 within the ejection zone 285. In particular, in addition to use of the ejection assembly 287, the system 200 may utilize an optional system 279 (e.g., a reduced pressure system) configured to reduce the pressure on the opposite side of the first portion 252 from the ejection assembly 287 to facilitate pulling the batch of shaped adsorbent particles 291 from the opening 254. The process may include providing a negative pressure difference on the side of the shaping assembly opposite the ejection assembly 287.

After ejecting the precursor mixture 201 from the opening 254 of the first portion 252, a batch of shaped adsorbent particles is formed. According to a particular embodiment, the batch of shaped adsorbent particles can have a shape substantially replicating the shape of the openings 254.

Referring now to the precursor mixture (i.e., the precursor mixture described in reference to forming process 100 and/or the precursor mixture 201 described in reference to system 200), according to certain embodiments, the precursor mixture may include any combination of materials necessary for forming a shaped adsorbent particle. For example, the precursor mixture may include ceramic components, such as, aluminas, boehmites, bayerites, aluminum hydroxides, silicas, titanias, zirconias, and combinations thereof. According to still other embodiments, the precursor mixture may also include metal components, such as, transition metals including Sc, Ti, V, Cr, Mn, Fe, Co, Ni, Cu, Y, Zr, Nb, Mo, Tc, Ru, Rh, Pd, Ag, Hf, Ta, W, Re, Os, Jr, Pt, Au, Rf, Db, Sg, Bh, Hs (i.e., transition metals contained in groups 3-11 of the periodic table) and combinations thereof. According to yet other embodiments, the precursor mixture may further include alkali and alkaline earth metal components, such as, Li, Be, Na, Mg, K, Ca, Rb, Sr, Cs, Ba, and combinations thereof. According to still other embodiments, the precursor mixture may include alumina, carbon, metal organic framework (MOF) or combinations thereof.

Referring now to the batch of shaped adsorbent particles (i.e., the batch of shaped adsorbent particles described in reference to forming process 100 and/or the batch of adsorbent particles described in reference to system 200), according to certain embodiments, the batch of shaped adsorbent particles may include ceramic components, such as, aluminas, boehmites, bayerites, aluminum hydroxides, silicas, titanias, zirconias, and combinations thereof. According to still other embodiments, the batch of shaped adsorbent particles may also include metal components, such as, transition metals including Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs (i.e., transition metals contained in groups 3-11 of the periodic table) and combinations thereof. According to yet other embodiments, the batch of shaped adsorbent particles may further include alkali and alkaline earth metal components, such as, Li, Be, Na, Mg, K, Ca, Rb, Sr, Cs, Ba, and combinations thereof. According to still other embodiments, the batch of shaped adsorbent particles may include alumina, carbon, metal organic framework (MOF) or combinations thereof.

According to still other embodiments, the batch of shaped adsorbent particles may have particular moisture content. For purposes of embodiments described herein, moisture content of a sample of the batch of shaped adsorbent particles is determined using the Mettler Toledo HB43 moisture analyzer. The lid of the analyzer is closed to tare the instrument. A sample of the batch of shaped adsorbent particles of at least 0.5 g and less than 1 g is placed on the balance, and the lid is closed to begin heating. The balance is heated to a maximum temperature of 155° C. while continuously measuring the sample's mass. As the temperature increases, the mass of the sample decreases as water evaporates. This mass is automatically converted to percent solid (% solid=[mass]/[initial mass]) which is displayed by the analyzer continuously to the nearest 0.01 g. When the sample reaches a stable percent solid reading for 30 seconds, the heating and measurement terminates. The displayed value is taken to be the percentage of solid material in the sample. This value is then subtracted from 1 to yield the percentage of water, or moisture content, of the sample.

According to particular embodiments, the batch of shaped adsorbent particles may have a moisture content of at least about 20 wt. % based on a total weight of the batch of adsorbent particles, such as, at least about 21 wt. % or at least about 22 wt. % or at least about 23 wt. % or at least about 24 wt. % or at least about 25 wt. % or at least about 26 wt. % or at least about 27 wt. % or at least about 28 wt. % or at least about 29 wt. % or at least about 30 wt. % or at least about 31 wt. % or at least about 32 wt. % or at least about 33 wt. % or at least about 34 wt. % or at least about 35 wt. % or at least about 36 wt. % or at least about 37 wt. % or at least about 38 wt. % or at least about 39 wt. % or at least about 40 wt. % or at least about 41 wt. % or at least about 42 wt. % or at least about 43 wt. % or at least about 44 wt. % or even at least about 45 wt. %. According to still other embodiments, the batch of shaped adsorbent particles may have a moisture content of not greater than about 60 wt. % based on a total weight of the batch of adsorbent particles, such as, not greater than about 58 wt. % or not greater than about 56 wt. % or not greater than about 54 wt. % or not greater than about 52 wt. % or not greater than about 50 wt. %. It will be appreciated that the moisture content of the batch of shaped adsorbent particles may be any value between, and including, any of the minimum and maximum values noted above. It will be further appreciated that the moisture content of the batch of shaped adsorbent particles may be within a range between, and including, any of the minimum and maximum values noted above.

According to yet other embodiments, the batch of shaped adsorbent particles may include a plurality of particles having a columnar shape with a particular cross-sectional shape along the length of the particle. According to still other embodiments, the plurality of particles may have a circular cross-sectional shape along the length of the particle. According to yet other embodiments, the plurality of particles may have an oval cross-sectional shape along the length of the particle. According to still other embodiments, the plurality of particles may have a polygonal cross-sectional shape along the length of the particle.

According to still other embodiments, the particles in the batch of shaped adsorbent particles, which has a columnar shape, may have basic dimensions including length (L), cross-sectional diameter (D) and aspect ratio (AR). For purposes of embodiments described herein, the length (L) of a particle is defined as the greatest dimension perpendicular to the cross-sectional shape of the particle. The cross-sectional diameter (D) is the greatest dimension of the cross-sectional shape of the particle. The aspect ratio (AR) of particles in the batch of shaped adsorbent particles is equal to the length (L) of a particle in the batch of shaped adsorbent particles divided by the cross-sectional diameter (D) of the particle in the batch of shaped adsorbent particles.

It will be appreciated that all measurements, including average length (L), average cross-sectional diameter (i.e., equivalent diameter) (D), and average particle aspect ratio (AR), of a particular batch of shaped adsorbent particles are measured using images collected with an Olympus DSX510 digital optical microscope. Particles of a sample batch are placed on the microscope stage and distributed in a monolayer. For low aspect ratio samples, the height of the lens was adjusted to bring the particles oriented sideways (rather than face-up) into focus. For high aspect ratio samples, all pieces were naturally oriented in this position and they were brought into focus in the same way. The "Live Panorama tool" is used to stitch together a 9 frame by 9 frame image. Measurements of length and diameter are performed for at least 25 particles within the Olympus software or using Image J. For all low aspect ratio samples, a single line segment can be used to measure both length (L) and diameter (D). For high aspect ratio samples, multiple line segments are required to measure length for some pieces. Aspect ratio (AR) of a given particle is calculated by dividing length by diameter. The values of D(10,50,90), L(10,50,90), and AR(10,50,90) are determined by first fitting the data to Gaussian distributions using the "NORM.DIST" function in Microsoft Excel. The "NORM.INV" function in Microsoft Excel is then used to extract these values from the distributions.

It will be further appreciated that all particle size measurements (i.e., D, L and AR) may be described herein in combination with D-Values (i.e., D10, D50 and D90), which may be understood to represent the distribution intercepts for 10%, 50% and 90% of the number of particles of a particular batch of shaped adsorbent particles. For example, a particular batch of particles may have a Diameter D10 value (i.e., $D_{10}$) defined as the diameter at which 10% of the sample's mass is comprised of particles with a diameter less than this value, a particular batch of particles may have a Diameter D50 value (i.e., $D_{50}$) defined as the diameter at which 50% of the sample's mass is comprised of particles with a diameter less than this value, and a particular batch of particles may have a Diameter D90 value (i.e., $D_{90}$) defined as the diameter at which 90% of the sample's mass is comprised of particles with a diameter less than this value. Further, a particular batch of particles may have a Length D10 value (i.e., $L_{10}$) defined as the length at which 10% of the sample's mass is comprised of particles with a length less than this value, a particular batch of particles may have a Length D50 value (i.e., $L_{50}$) defined as the length at which 50% of the sample's mass is comprised of particles with a length less than this value, and a particular batch of particles may have a Length D90 value (i.e., $L_{90}$) defined as the length at which 90% of the sample's mass is comprised of particles with a length less than this value. Finally, a particular batch of particles may have an Aspect Ratio D10 value (i.e., $AR_{10}$) defined as the aspect ratio at which 10% of the sample's mass is comprised of particles with an aspect ratio less than this value, a particular batch of particles may have an Aspect Ratio D50 value (i.e., $AR_{50}$) defined as the aspect ratio at which 50% of the sample's mass is comprised of particles with an aspect ratio less than this value, and a particular batch of particles may have an Aspect Ratio D90 value (i.e., $AR_{90}$) defined as the aspect ratio at which 90% of the sample's mass is comprised of particles with an aspect ratio less than this value.

According to still other embodiments, the batch of shaped adsorbent particles may have a particular length (L) distribution span PLDS, where PLDS is equal to $(L_{90}-L_{10})/L_{50}$, where $L_{90}$ is equal to a $L_{90}$ particle length (L) distribution measurement of the batch of shaped adsorbent particles, $L_{10}$ is equal to a $L_{10}$ particle length (L) distribution measurement, and $L_{50}$ is equal to a $L_{50}$ particle length (L) distribution measurement. According to certain embodiments, the batch of shaped adsorbent particles may have a length (L) distribution span PLDS of not greater than about 50%, such as, not greater than about 48% or not greater than about 45% or not greater than about 43% or not greater than about 40% or not greater than about 38% or not greater than about 35% or not greater than about 33% or even not greater than about 30%. It will be appreciated that the length (L) distribution span PLDS of the batch of shaped adsorbent particles may be any value between, and including, any of the minimum and maximum values noted above. It will be further appreciated that the length (L) distribution span PLDS of the batch of shaped adsorbent particles may be within a range between, and including, any of the minimum and maximum values noted above.

According to still other embodiments, the batch of shaped adsorbent particles may have a particular diameter (D) distribution span PDDS, where PDDS is equal to $(D_{90}-D_{10})/D_{50}$, where $D_{90}$ is equal to a $D_{90}$ particle diameter (D) distribution measurement of the batch of shaped adsorbent particles, $D_{10}$ is equal to a $D_{10}$ particle diameter (D) distribution measurement, and $D_{50}$ is equal to a $D_{50}$ particle diameter (D) distribution measurement. According to certain embodiments, the batch of shaped adsorbent particles may have a diameter (D) distribution span PDDS of not greater than about 50%, such as, not greater than about 48% or not greater than about 45% or not greater than about 43% or not greater than about 40% or not greater than about 38% or not greater than about 35% or not greater than about 33% or even not greater than about 30%. It will be appreciated that the diameter (D) distribution span PDDS of the batch of shaped adsorbent particles may be any value between, and including, any of the minimum and maximum values noted above. It will be further appreciated that the diameter (D) distribution span PDDS of the batch of shaped adsorbent particles may be within a range between, and including, any of the minimum and maximum values noted above.

According to still other embodiments, the batch of shaped adsorbent particles may have a particular aspect ratio (AR) distribution span PARDS, where PARDS is equal to $(AR_{90}-AR_{10})/AR_{50}$, where $AR_{90}$ is equal to a $AR_{90}$ particle aspect ratio (AR) distribution measurement of the batch of shaped adsorbent particles, $AR_{10}$ is equal to a $AR_{10}$ particle aspect ratio (AR) distribution measurement, and $AR_{50}$ is equal to a $AR_{50}$ particle aspect ratio (AR) distribution measurement. According to certain embodiments, the batch of shaped adsorbent particles may have an aspect ratio (AR) distribution span PARDS of not greater than about 50%, such as, not greater than about 48% or not greater than about 45% or not greater than about 43% or not greater than about 40% or not greater than about 38% or not greater than about 35% or not greater than about 33% or even not greater than about 30%. It will be appreciated that the aspect ratio (AR) distribution span PARDS of the batch of shaped adsorbent particles may be any value between, and including, any of the minimum and maximum values noted above. It will be further appreciated that the aspect ratio (AR) distribution span PARDS of the batch of shaped adsorbent particles may be within a range between, and including, any of the minimum and maximum values noted above.

According to yet other embodiments, the batch of shaped adsorbent particles may have a particular average particle cross-sectional diameter (D). According to certain embodiments, the batch of shaped adsorbent particles may have an average cross-sectional diameter of not greater than about 5.0 mm, such as, not greater than about 4.5 mm or not greater than about 4.0 mm or not greater than about 3.5 mm or not greater than about 3.0 mm or not greater than about 2.9 mm or not greater than about 2.8 mm or not greater than about 2.7 mm or not greater than about 2.6 mm or not greater than about 2.5 mm or not greater than about 2.4 mm or not greater than about 2.3 mm or not greater than about 2.2 mm or not greater than about 2.1 mm or not greater than about 2.0 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or even not greater than about 0.5 mm. According to still other embodiments, the batch of shaped adsorbent particles may have an average cross-sectional diameter of at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm. It will be appreciated that the average cross-sectional diameter of the batch of shaped adsorbent particles may be any value between, and including, any of the minimum and maximum values noted above. It will be further appreciated that the average cross-sectional diameter of the batch of shaped adsorbent particles may be within a range between, and including, any of the minimum and maximum values noted above.

According to still other embodiments, the batch of shaped adsorbent particles may have a particular average length (L). According to certain embodiments, the batch of shaped adsorbent particles may have an average particle length of at least about 0.001 mm, such as, at least about 0.005 mm or at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or even at least about 0.3 mm. According to yet other embodiments, the batch of shaped adsorbent particles may have an average particle length of not greater than about 10 mm, such as, not greater than about 9 mm or not greater than about 8 mm or not greater than about 7 mm or not greater than about 6 mm or not greater than about 5 mm or not greater than about 4 mm or not greater than about 3 mm or not greater than about 2 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm or not greater than about 0.4 mm or not greater than about 0.3 mm or not greater than about 0.2 mm or not greater than about 0.1. It will be appreciated that the average length of the batch of shaped adsorbent particles may be any value between, and including, any of the minimum and maximum values noted above. It will be further appreciated that the average length of the batch of shaped adsorbent particles may be within a range between, and including, any of the minimum and maximum values noted above.

According to yet other embodiments, the batch of shaped adsorbent particles may have a particular average aspect ratio (AR). According to certain embodiments, the batch of shaped adsorbent particles may have an average aspect ratio (AR) of not greater than about 2, such as, not greater than about 1.9 or not greater than about 1.8 or not greater than about 1.7 or not greater than about 1.6 or not greater than about 1.5 or not greater than about 1.4 or not greater than about 1.3 or not greater than about 1.2 or not greater than about 1.1 or not greater than about 0.9 or not greater than about 0.8 or not greater than about 0.7 or not greater than about 0.6 or even not greater than about 0.5. According to still other embodiments, the batch of shaped adsorbent particles may have an average aspect ratio (AR) of at least about 0.1, such as, at least about 0.2 or even at least about 0.3. It will be appreciated that the average aspect ratio (AR) of the batch of shaped adsorbent particles may be any value between, and including, any of the minimum and maximum values noted above. It will be further appreciated that the average aspect ratio (AR) of the batch of shaped adsorbent particles may be within a range between, and including, any of the minimum and maximum values noted above.

According to yet other embodiments, the batch of shaped adsorbent particles may have a particular packing density. For purposes of embodiments described herein, packing density is measured using a 100 mL graduated cylinder, which is weighed and then filled to the 100 mL level with a sample of the batch of shaped adsorbent particles. An AT-2 Autotap Tap Density Analyzer (manufactured by Quantachrome Instruments located in Boynton Beach, Fla., USA) is set to perform 1000 taps and tapping is initiated. After completion of 1000 taps, the volume of the sample is measured to the nearest 0.5 mL. The sample and graduated cylinder are then weighed and the mass of the empty graduated cylinder is subtracted to yield the mass of the sample, which is then divided by the volume of the sample to obtain the packing density.

According to certain embodiments, the batch of shaped adsorbent particles may have a packing density of at least about 0.6 g/cm$^3$, such as, at least about 0.62 g/cm$^3$ or at least about 0.64 g/cm$^3$ or at least about 0.66 g/cm$^3$ or at least about 0.68 g/cm$^3$ or at least about 0.70 g/cm$^3$ or even at least about 0.72 g/cm$^3$. According to still other embodiments, the batch of shaped adsorbent particles may have a packing density of not greater than about 1.5 g/cm$^3$, such as, not greater than about 1.40 g/cm$^3$ or not greater than about 1.30 g/cm$^3$ or not greater than about 1.20 g/cm$^3$ or not greater than about 1.10 g/cm$^3$ or not greater than about 1.0 g/cm$^3$ or not greater than about 0.98 g/cm$^3$ or not greater than about 0.96 g/cm$^3$ or not greater than about 0.94 g/cm$^3$ or not greater than about 0.92 g/cm$^3$ or not greater than about 0.90 g/cm$^3$ or not greater than about 0.88 g/cm$^3$ or not greater than about 0.86 g/cm$^3$ or not greater than about 0.84 g/cm$^3$ or even not greater than about 0.82 g/cm$^3$. It will be appreciated that the packing density of the batch of shaped adsorbent particles may be any value between, and including, any of the minimum and maximum values noted above. It will be further appreciated that the packing density of the batch of shaped adsorbent particles may be within a range between, and including, any of the minimum and maximum values noted above.

According to yet other embodiments, the batch of shaped adsorbent particles may have a particular envelope density. For purposes of embodiments described herein, envelope density is measured using a Micromeritics Geo-Pycnometer 1360 instrument. This instrument determines density by measuring the change in volume when a sample of known mass is introduced in to a chamber containing Micromeritics DryFlo™. DryFlo consists of small ceramic beads coated in graphite powder. A calibration is first performed with only DryFlo present in the cylindrical sample chamber. The contents of the chamber are pressed by a plunger to a maximum force of 90 N, and the distance that the plunger is pressed to achieve this force is recorded by the instrument.

From this distance measurement, the volume of the DryFlo within the sample chamber is calculated by the instrument. This cycle is repeated five times for the calibration, and the average volume is obtained. The chamber and plunger are then removed and a sample of the batch of shaped adsorbent particles of known mass (about 2.5 grams) is added to the DryFlo in the chamber. The measured mass is input into the instrument. The process of pressing the plunger to a maximum force of 90 N is then repeated for five cycles with the sample present in the chamber. The instrument calculates the average volume of the DryFlo-sample mixture from the distance that the plunger was pressed for each cycle. By subtracting the average volume for the DryFlo calibration from the average volume for the DryFlo-sample run, the volume of the sample is obtained. With the mass of the sample known, the instrument outputs the density of the sample by dividing mass by volume.

According to yet other embodiments, the batch of shaped adsorbent particles may have a envelope density of at least about 0.9 g/cm$^3$, such as, at least about 0.92 g/cm$^3$ or at least about 0.94 g/cm$^3$ or at least about 0.96 g/cm$^3$ or at least about 0.98 g/cm$^3$ or at least about 1.0 g/cm$^3$ or even at least about 1.02 g/cm$^3$. According to still other embodiments, the batch of shaped adsorbent particles may have a envelope density of not greater than about 2.0 g/cm$^3$, such as, not greater than about 1.9 g/cm$^3$ or not greater than about 1.8 g/cm$^3$ or not greater than about 1.7 g/cm$^3$ or not greater than about 1.6 g/cm$^3$ or not greater than about 1.5 g/cm$^3$ or not greater than about 1.4 g/cm$^3$ or not greater than about 1.3 g/cm$^3$ or not greater than about 1.28 g/cm$^3$ or not greater than about 1.26 g/cm$^3$ or not greater than about 1.24 g/cm$^3$ or even not greater than about 1.22 g/cm$^3$. It will be appreciated that the envelope density of the batch of shaped adsorbent particles may be any value between, and including, any of the minimum and maximum values noted above. It will be further appreciated that the envelope density of the batch of shaped adsorbent particles may be within a range between, and including, any of the minimum and maximum values noted above.

According to yet other embodiments, the batch of shaped adsorbent particles may have a particular void volume. For purposes of embodiments described herein, void volume is a percentage within a sample of the batch of shaped adsorbent particles calculated by subtracting the packing density from the envelope density, and then by dividing this difference by the envelope density.

According to particular embodiments, the batch of shaped adsorbent particles may have a void volume of at least about 5%, such as, at least about 10% or at least about 18% or at least about 20% or at least about 23% or even at least about 25%. According to still other embodiments, the batch of shaped adsorbent particles may have a void volume of not greater than about 45%, such as, not greater than about 42% or not greater than about 40% or not greater than about 37% or even not greater than about 35%. It will be appreciated that the void volume of the batch of shaped adsorbent particles may be any value between, and including, any of the minimum and maximum values noted above. It will be further appreciated that the void volume of the batch of shaped adsorbent particles may be within a range between, and including, any of the minimum and maximum values noted above.

According to certain embodiments, the shaped adsorbent particles of the batch of shaped adsorbent particles may be porous solid particulate materials. According to yet other embodiments, the shaped adsorbent particles of the batch of shaped adsorbent particles may be porous solid particles configured for uptake and immobilization of a species from a surrounding medium by one or more adsorption processes. According to yet other embodiments, the shaped adsorbent particles of the batch of shaped adsorbent particles may be further configured for desorption of the species from the surrounding medium subsequent to uptake and immobilization of the species.

According to still other embodiments, the shaped adsorbent particles may not be configured for use as abrasive particles. According to other embodiments, the shaped adsorbent particles may not be abrasive particles.

According to yet other embodiments, the shaped adsorbent particles may not be configured for use in material removal through a grinding operation. According to yet other embodiments, the shaped adsorbent particles may not be configured for use in material removal through a grinding operation of a workpiece having a particular Vickers hardness. For example, the shaped adsorbent particles may not be configured for use in material removal through a grinding operation of a workpiece having a Vickers hardness of at least about 5 GPa, such as, at least about 10 GPa or even at least about 11 GPa. It will be appreciated that the workpiece Vickers hardness may be any value between, and including, any of the minimum and maximum values noted above. It will be further appreciated that the workpiece Vickers hardness may be within a range between, and including, any of the minimum and maximum values noted above.

According to yet other embodiments, the shaped adsorbent particles may have a Mohs hardness that not greater than a Mohs hardness of abrasive particles. According to certain embodiments, the shaped adsorbent particles have a particular Mohs hardness. For example, the Mohs hardness of the shaped adsorbent particles may be not greater than about 7, such as, not greater than about 6 or not greater than about 5 or not greater than about 4 or not greater than about 3 or not greater than about 2 or even not greater than about 1. It will be appreciated that the Mohs hardness of the shaped adsorbent particles may be any value between, and including, any of the minimum and maximum values noted above. It will be further appreciated that the Mohs hardness of the shaped adsorbent particles may be within a range between, and including, any of the minimum and maximum values noted above.

According to yet other embodiments, the shaped adsorbent particles may have a Vickers hardness that not greater than a Vickers hardness of abrasive particles. According to certain embodiments, the shaped adsorbent particles have a particular Vickers hardness. For example, the Vickers hardness of the shaped adsorbent particles may be not greater than about 11 GPa, such as, not greater than about 10 GPa or even not greater than about 5 GPa. It will be appreciated that the Vickers hardness of the shaped adsorbent particles may be any value between, and including, any of the minimum and maximum values noted above. It will be further appreciated that the Vickers hardness of the shaped adsorbent particles may be within a range between, and including, any of the minimum and maximum values noted above.

It will be appreciated that embodiments described herein may, in particular, be directed to the formation of a batch of shaped lithium bayerite adsorbent particles having generally uniform shape throughout the batch.

For purposes of embodiments described herein, adsorbent particles for lithium adsorption (e.g. lithium bayerite adsorbent particles) are defined as adsorbent particles configured for, useful for, or directly applied for the adsorption of lithium-containing species (e.g. a solid, a liquid, a gas, a molecule, an atom, or an ion) from a surrounding medium (e.g. a solid, a liquid, or a gas) by one or more adsorption processes including physisorption, chemisorption, intercalation, and ion exchange. The adsorbed lithium based compound may be subsequently removed or desorbed allowing as a consequence the adsorbent to be reused and advantageously the adsorbed components to be recovered (and concentrated).

Figure 3:
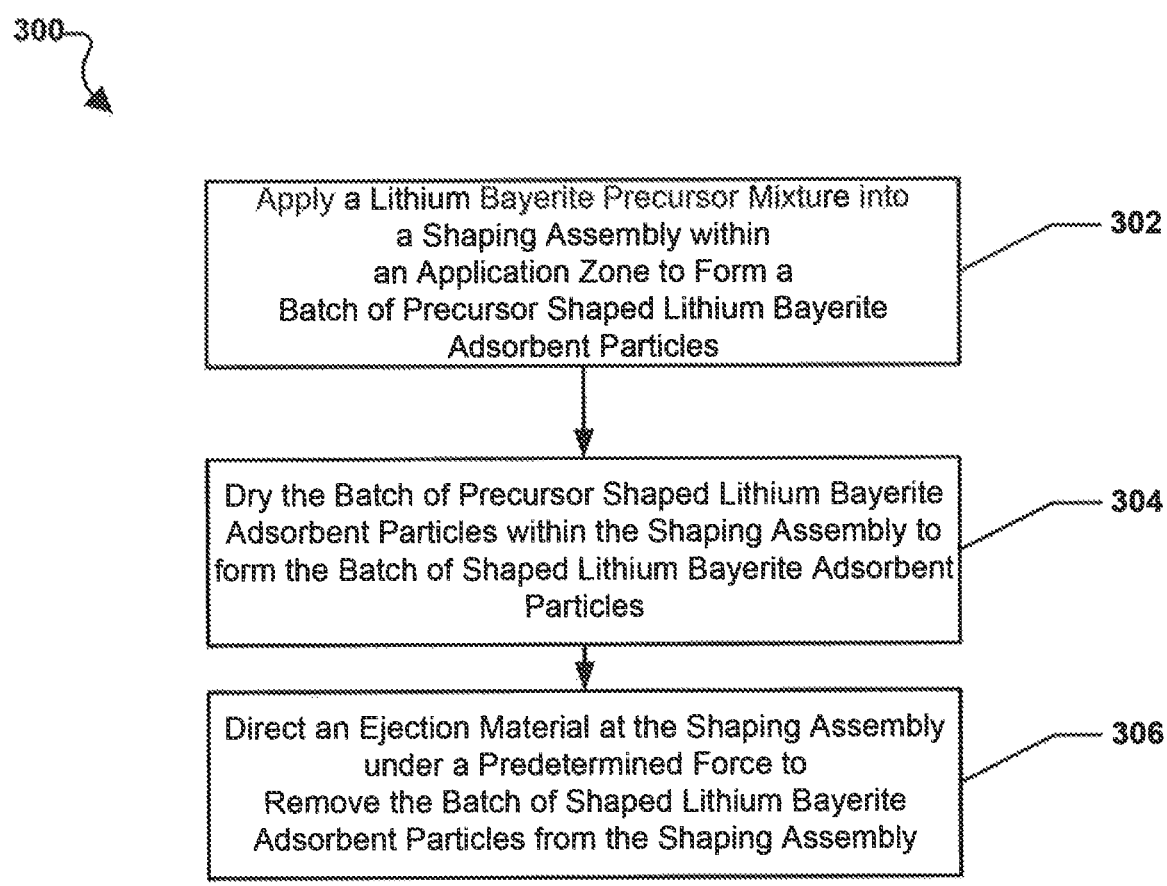
FIG. 3 is an illustration of a flowchart of a method of making a batch of shaped adsorbent particles in accordance with an embodiment.

Referring to a method of forming a batch of shaped lithium bayerite adsorbent particles, FIG. 3 illustrates a shaped adsorbent particles forming process generally designated 300. Shaped lithium bayerite adsorbent particles forming process 300 may include a first step 302 of applying a precursor lithium bayerite mixture into a shaping assembly within an application zone to form a batch of precursor shaped lithium bayerite adsorbent particles, a second step 304 of drying the batch of precursor shaped lithium bayerite adsorbent particles within the shaping assembly to form the batch of shaped lithium bayerite adsorbent particles and a third step 306 of ejecting the batch of shaped lithium bayerite adsorbent particles from the shaping assembly.

Referring now to the lithium bayerite precursor mixture according to certain embodiments, the lithium bayerite precursor mixture may include any combination of materials necessary for forming a shaped lithium bayerite adsorbent particle.

Referring now to the batch of shaped adsorbent particles, according to certain embodiments, the batch of shaped adsorbent particles may include a lithium aluminate. According to still other embodiments, the batch of shaped adsorbent particles formed according to the forming process 300 described herein may include a 2-layer lithium aluminate. According to yet other embodiments, the batch of shaped adsorbent particles may include lithium bayerite. According to still other particular embodiments, the batch of shaped adsorbent particles formed according to the forming process 300 described herein may include a solid material of the formula $(LiCl)_x \cdot 2Al(OH)_3 \cdot nH_2O$, with n being between 0.01 and 10, preferably between 0.1 and 5, and preferably between 0.1 and 1.

According to still other embodiments, the batch of shaped lithium bayerite adsorbent particles may have particular moisture content measured as described herein. According to particular embodiments, the batch of shaped lithium bayerite adsorbent particles may have a moisture content of at least about 20 wt. % based on a total weight of the batch of adsorbent particles, such as, at least about 21 wt. % or at least about 22 wt. % or at least about 23 wt. % or at least about 24 wt. % or at least about 25 wt. % or at least about 26 wt. % or at least about 27 wt. % or at least about 28 wt. % or at least about 29 wt. % or at least about 30 wt. % or at least about 31 wt. % or at least about 32 wt. % or at least about 33 wt. % or at least about 34 wt. % or at least about 35 wt. % or at least about 36 wt. % or at least about 37 wt. % or at least about 38 wt. % or at least about 39 wt. % or at least about 40 wt. % or at least about 41 wt. % or at least about 42 wt. % or at least about 43 wt. % or at least about 44 wt. % or even at least about 45 wt. %. According to still other embodiments, the batch of shaped lithium bayerite adsorbent particles may have a moisture content of not greater than about 60 wt. % based on a total weight of the batch of adsorbent particles, such as, not greater than about 58 wt. % or not greater than about 56 wt. % or not greater than about 54 wt. % or not greater than about 52 wt. % or not greater than about 50 wt. %. It will be appreciated that the moisture content of the batch of shaped lithium bayerite adsorbent particles may be any value between, and including, any of the minimum and maximum values noted above. It will be further appreciated that the moisture content of the batch of shaped lithium bayerite adsorbent particles may be within a range between, and including, any of the minimum and maximum values noted above.

According to yet other embodiments, the batch of shaped lithium bayerite adsorbent particles may include a plurality of particles having a columnar shape. According to still other embodiments, the plurality of particle may have a circular cross-sectional shape. According to yet other embodiments, the plurality of particles may have an oval cross-sectional shape. According to still other embodiments, the plurality of particles may have a polygonal cross-sectional shape.

According to still other embodiments, the particles in the batch of shaped lithium bayerite adsorbent particles, which has a columnar shape, may have basic dimensions including length (L), cross-sectional diameter (D) and aspect ratio (AR). For purposes of embodiments described herein, the length (L) of a particle is defined as the greatest dimension perpendicular to the cross-sectional shape of the particle. The cross-sectional diameter (D) is the greatest dimension of the cross-sectional shape of the particle. The aspect ratio (AR) of particles in the batch of shaped lithium bayerite adsorbent particles is equal to the length (L) of a particle in the batch of shaped lithium bayerite adsorbent particles divided by the cross-sectional diameter (D) of the particle in the batch of shaped lithium bayerite adsorbent particles. It will be further appreciated that all measurements, including average length (L), average cross-sectional diameter (D) and average particle aspect ratio (AR), of a particular batch of shaped lithium bayerite adsorbent particles are measured using a Malvern Morphologi 3 particle size and shape analyzer. A sample of particles is placed on a microscope slide and spread into an even monolayer where no individual particle is in contact with another. The analyzer takes images of the particles and the software then calculates different morphological properties for each particle including the length and diameter. The average length (L), average cross-sectional diameter (D) and average aspect ratio (AR) is calculated based on images taken of at least 400 to 500 particles from a particular batch of shaped lithium bayerite adsorbent particles (side view images).

According to still other embodiments, the batch of shaped lithium bayerite adsorbent particles may have a particular length (L) distribution span PLDS, where PLDS is equal to $(L_{90}-L_{10})/L_{50}$, where $L_{90}$ is equal to a $L_{90}$ particle length (L) distribution measurement of the batch of shaped lithium bayerite adsorbent particles, $L_{10}$ is equal to a $L_{10}$ particle length (L) distribution measurement, and $L_{50}$ is equal to a $L_{50}$ particle length (L) distribution measurement. According to certain embodiments, the batch of shaped lithium bayerite adsorbent particles may have a length (L) distribution span PLDS of not greater than about 50%, such as, not greater than about 48% or not greater than about 45% or not greater than about 43% or not greater than about 40% or not greater than about 38% or not greater than about 35% or not greater than about 33% or even not greater than about 30%. It will be appreciated that the length (L) distribution span PLDS of the batch of shaped lithium bayerite adsorbent particles may be any value between, and including, any of the minimum and maximum values noted above. It will be further appreciated that the length (L) distribution span PLDS of the batch of shaped lithium bayerite adsorbent particles may be within a range between, and including, any of the minimum and maximum values noted above.

According to still other embodiments, the batch of shaped lithium bayerite adsorbent particles may have a particular diameter (D) distribution span PDDS, where PDDS is equal to $(D_{90}-D_{10})/D_{50}$, where $D_{90}$ is equal to a $D_{90}$ particle diameter (D) distribution measurement of the batch of shaped lithium bayerite adsorbent particles, $D_{10}$ is equal to a $D_{10}$ particle diameter (D) distribution measurement, $D_{50}$ is equal to a $D_{50}$ particle diameter (D) distribution measurement. According to certain embodiments, the batch of shaped lithium bayerite adsorbent particles may have a diameter (D) distribution span PDDS of not greater than about 50%, such as, not greater than about 48% or not greater than about 45% or not greater than about 43% or not greater than about 40% or not greater than about 38% or not greater than about 35% or not greater than about 33% or even not greater than about 30%. It will be appreciated that the diameter (D) distribution span PDDS of the batch of shaped lithium bayerite adsorbent particles may be any value between, and including, any of the minimum and maximum values noted above. It will be further appreciated that the diameter (D) distribution span PDDS of the batch of shaped lithium bayerite adsorbent particles may be within a range between, and including, any of the minimum and maximum values noted above.

According to still other embodiments, the batch of shaped lithium bayerite adsorbent particles may have a particular aspect ratio (AR) distribution span PARDS, where PARDS is equal to $(AR_{90}-AR_{10})/AR_{50}$, where $AR_{90}$ is equal to a $AR_{90}$ particle aspect ratio (AR) distribution measurement of the batch of shaped lithium bayerite adsorbent particles, $AR_{10}$ is equal to a $AR_{10}$ particle aspect ratio (AR) distribution measurement, $AR_{50}$ is equal to a $AR_{50}$ particle aspect ratio (AR) distribution measurement. According to certain embodiments, the batch of shaped lithium bayerite adsorbent particles may have an aspect ratio (AR) distribution span PARDS of not greater than about 50%, such as, not greater than about 48% or not greater than about 45% or not greater than about 43% or not greater than about 40% or not greater than about 38% or not greater than about 35% or not greater than about 33% or even not greater than about 30%. It will be appreciated that the aspect ratio (AR) distribution span PARDS of the batch of shaped lithium bayerite adsorbent particles may be any value between, and including, any of the minimum and maximum values noted above. It will be further appreciated that the aspect ratio (AR) distribution span PARDS of the batch of shaped lithium bayerite adsorbent particles may be within a range between, and including, any of the minimum and maximum values noted above.

According to yet other embodiments, the batch of shaped lithium bayerite adsorbent particles may have a particular average particle cross-sectional diameter (D). According to certain embodiments, the batch of shaped lithium bayerite adsorbent particles may have an average cross-sectional diameter of not greater than about 5.0 mm, such as, not greater than about 4.5 mm or not greater than about 4.0 mm or not greater than about 3.5 mm or not greater than about 3.0 mm or not greater than about 2.9 mm or not greater than about 2.8 mm or not greater than about 2.7 mm or not greater than about 2.6 mm or not greater than about 2.5 mm or not greater than about 2.4 mm or not greater than about 2.3 mm or not greater than about 2.2 mm or not greater than about 2.1 mm or not greater than about 2.0 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or even not greater than about 0.5 mm. According to still other embodiments, the batch of shaped lithium bayerite adsorbent particles may have an average cross-sectional diameter of at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm. It will be appreciated that the average cross-sectional diameter of the batch of shaped lithium bayerite adsorbent particles may be any value between, and including, any of the minimum and maximum values noted above. It will be further appreciated that the average cross-sectional diameter of the batch of shaped lithium bayerite adsorbent particles may be within a range between, and including, any of the minimum and maximum values noted above.

According to still other embodiments, the batch of shaped lithium bayerite adsorbent particles may have a particular average length (L). According to certain embodiments, the batch of shaped lithium bayerite adsorbent particles may have an average particle length of at least about 0.001 mm, such as, at least about 0.005 mm or at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or even at least about 0.3 mm. According to yet other embodiments, the batch of shaped lithium bayerite adsorbent particles may have an average particle length of not greater than about 10 mm, such as, not greater than about 9 mm or not greater than about 8 mm or not greater than about 7 mm or not greater than about 6 mm or not greater than about 5 mm or not greater than about 4 mm or not greater than about 3 mm or not greater than about 2 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm or not greater than about 0.4 mm or not greater than about 0.3 mm or not greater than about 0.2 mm or not greater than about 0.1. It will be appreciated that the average length of the batch of shaped lithium bayerite adsorbent particles may be any value between, and including, any of the minimum and maximum values noted above. It will be further appreciated that the average length of the batch of shaped lithium bayerite adsorbent particles may be within a range between, and including, any of the minimum and maximum values noted above.

According to yet other embodiments, the batch of shaped lithium bayerite adsorbent particles may have a particular average aspect ratio (AR). According to certain embodiments, the batch of shaped lithium bayerite adsorbent particles may have an average aspect ratio (AR) of not greater than about 2, such as, not greater than about 1.9 or not greater than about 1.8 or not greater than about 1.7 or not greater than about 1.6 or not greater than about 1.5 or not greater than about 1.4 or not greater than about 1.3 or not greater than about 1.2 or not greater than about 1.1 or not greater than about 0.9 or not greater than about 0.8 or not greater than about 0.7 or not greater than about 0.6 or even not greater than about 0.5. According to still other embodiments, the batch of shaped lithium bayerite adsorbent particles may have an average aspect ratio (AR) of at least about 0.1, such as, at least about 0.2 or even at least about 0.3. It will be appreciated that the average aspect ratio (AR) of the batch of shaped lithium bayerite adsorbent particles may be any value between, and including, any of the minimum and maximum values noted above. It will be further appreciated that the average aspect ratio (AR) of the batch of shaped lithium bayerite adsorbent particles may be within a range between, and including, any of the minimum and maximum values noted above.

According to yet other embodiments, the batch of shaped lithium bayerite adsorbent particles may have a particular packing density measured as described herein. According to certain embodiments, the batch of shaped lithium bayerite adsorbent particles may have a packing density of at least about 0.6 g/cm$^3$, such as, at least about 0.62 g/cm$^3$ or at least about 0.64 g/cm$^3$ or at least about 0.66 g/cm$^3$ or at least about 0.68 g/cm$^3$ or at least about 0.70 g/cm$^3$ or even at least about 0.72 g/cm$^3$. According to still other embodiments, the batch of shaped lithium bayerite adsorbent particles may have a packing density of not greater than about 1.5 g/cm$^3$, such as, not greater than about 1.40 g/cm$^3$ or not greater than about 1.30 g/cm$^3$ or not greater than about 1.20 g/cm$^3$ or not greater than about 1.10 g/cm$^3$ or not greater than about 1.0 g/cm$^3$ or not greater than about 0.98 g/cm$^3$ or not greater than about 0.96 g/cm$^3$ or not greater than about 0.94 g/cm$^3$ or not greater than about 0.92 g/cm$^3$ or not greater than about 0.90 g/cm$^3$ or not greater than about 0.88 g/cm$^3$ or not greater than about 0.86 g/cm$^3$ or not greater than about 0.84 g/cm$^3$ or even not greater than about 0.82 g/cm$^3$. It will be appreciated that the packing density of the batch of shaped lithium bayerite adsorbent particles may be any value between, and including, any of the minimum and maximum values noted above. It will be further appreciated that the packing density of the batch of shaped lithium bayerite adsorbent particles may be within a range between, and including, any of the minimum and maximum values noted above.

According to yet other embodiments, the batch of shaped lithium bayerite adsorbent particles may have a particular envelope density measured as described herein. According to yet other embodiments, the batch of shaped lithium bayerite adsorbent particles may have an envelope density of at least about 0.9 g/cm$^3$, such as, at least about 0.92 g/cm$^3$ or at least about 0.94 g/cm$^3$ or at least about 0.96 g/cm$^3$ or at least about 0.98 g/cm$^3$ or at least about 1.0 g/cm$^3$ or even at least about 1.02 g/cm$^3$. According to still other embodiments, the batch of shaped lithium bayerite adsorbent particles may have an envelope density of not greater than about 2.0 g/cm$^3$, such as, not greater than about 1.9 g/cm$^3$ or not greater than about 1.8 g/cm$^3$ or not greater than about 1.7 g/cm$^3$ or not greater than about 1.6 g/cm$^3$ or not greater than about 1.5 g/cm$^3$ or not greater than about 1.4 g/cm$^3$ or not greater than about 1.3 g/cm$^3$ or not greater than about 1.28 g/cm$^3$ or not greater than about 1.26 g/cm$^3$ or not greater than about 1.24 g/cm$^3$ or even not greater than about 1.22 g/cm$^3$. It will be appreciated that the envelope density of the batch of shaped lithium bayerite adsorbent particles may be any value between, and including, any of the minimum and maximum values noted above. It will be further appreciated that the envelope density of the batch of shaped lithium bayerite adsorbent particles may be within a range between, and including, any of the minimum and maximum values noted above.

According to yet other embodiments, the batch of shaped lithium bayerite adsorbent particles may have a particular void volume calculated as described herein. According to particular embodiments, the batch of shaped lithium bayerite adsorbent particles may have a void volume of at least about 5%, such as, at least about 10% or at least about 18% or at least about 20% or at least about 23% or even at least about 25%. According to still other embodiments, the batch of shaped lithium bayerite adsorbent particles may have a void volume of not greater than about 45%, such as, not greater than about 42% or not greater than about 40% or not greater than about 37% or even not greater than about 35%. It will be appreciated that the void volume of the batch of shaped lithium bayerite adsorbent particles may be any value between, and including, any of the minimum and maximum values noted above. It will be further appreciated that the void volume of the batch of shaped lithium bayerite adsorbent particles may be within a range between, and including, any of the minimum and maximum values noted above.

According to certain embodiments, the shaped lithium bayerite adsorbent particles may be porous solid particles. According to yet other embodiments, the shaped lithium bayerite adsorbent particles may be porous solid particles configured for uptake and immobilization of a lithium-containing species from a surrounding medium by one or more adsorption processes. According to still other embodiments, the shaped lithium bayerite adsorbent particles may be porous solid particles configured for selective uptake and immobilization of a lithium-containing species from a surrounding medium by one or more adsorption processes. According to yet other embodiments, the shaped lithium bayerite adsorbent particles may be further configured for desorption of the lithium-containing species from the surrounding medium subsequent to uptake and immobilization of the species. According to other embodiments, the shaped lithium bayerite adsorbent particles may be further configured for selective desorption of the lithium-containing species from the surrounding medium subsequent to uptake and immobilization of the species.

According to still other embodiments, the shaped lithium bayerite adsorbent particles may not be configured for use as abrasive particles. According to other embodiments, the shaped lithium bayerite adsorbent particles may not be abrasive particles.

According to yet other embodiments, the shaped lithium bayerite adsorbent particles may not be configured for use in material removal through a grinding operation. According to yet other embodiments, the shaped lithium bayerite adsorbent particles may not be configured for use in material removal through a grinding operation of a workpiece having a particular Vickers hardness. For example, the shaped lithium bayerite adsorbent particles may not be configured for use in material removal through a grinding operation of a workpiece having a Vickers hardness of at least about 5 GPa, such as, at least about 10 GPa or even at least about 11 GPa. It will be appreciated that the workpiece Vickers hardness may be any value between, and including, any of the minimum and maximum values noted above. It will be further appreciated that the workpiece Vickers hardness may be within a range between, and including, any of the minimum and maximum values noted above.

According to yet other embodiments, the shaped lithium bayerite adsorbent particles may have a Mohs hardness that not greater than a Mohs hardness of abrasive particles. According to certain embodiments, the shaped lithium bayerite adsorbent particles have a particular Mohs hardness. For example, the Mohs hardness of the shaped lithium bayerite adsorbent particles may be not greater than about 7, such as, not greater than about 6 or not greater than about 5 or not greater than about 4 or not greater than about 3 or not greater than about 2 or even not greater than about 1. It will be appreciated that the Mohs hardness of the shaped lithium bayerite adsorbent particles may be any value between, and including, any of the minimum and maximum values noted above. It will be further appreciated that the Mohs hardness of the shaped lithium bayerite adsorbent particles may be within a range between, and including, any of the minimum and maximum values noted above.

According to yet other embodiments, the shaped lithium bayerite adsorbent particles may have a Vickers hardness that not greater than a Vickers hardness of abrasive particles. According to certain embodiments, the shaped lithium bayerite adsorbent particles have a particular Vickers hardness. For example, the Vickers hardness of the shaped lithium bayerite adsorbent particles may be not greater than about 11 GPa, such as, not greater than about 10 GPa or even not greater than about 5 GPa. It will be appreciated that the Vickers hardness of the shaped lithium bayerite adsorbent particles may be any value between, and including, any of the minimum and maximum values noted above. It will be further appreciated that the Vickers hardness of the shaped lithium bayerite adsorbent particles may be within a range between, and including, any of the minimum and maximum values noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A method of forming a batch of shaped adsorbent particles, wherein the method comprises: applying a precursor mixture into a shaping assembly within an application zone to form a batch of precursor shaped adsorbent particles; drying the batch of precursor shaped adsorbent particles within the shaping assembly to form the batch of shaped adsorbent particles; and ejecting the batch of shaped adsorbent particles from the shaping assembly, wherein the batch of shaped adsorbent particles comprises a moisture content of at least about 20 wt. %.

Embodiment 2. The method of embodiment 1, wherein applying the precursor mixture into a shaping assembly comprises extruding the precursor mixture through a die opening and into the shaping assembly, wherein the shaping assembly comprises an opening configured to receive the precursor mixture, wherein the opening is defined by at least three surfaces, wherein the opening extends through an entire thickness of a first portion of the shaping assembly, wherein the opening extends through an entire thickness of the shaping assembly, wherein the opening extends through a portion of an entire thickness of the shaping assembly.

Embodiment 3. The method of embodiment 1, wherein the shaping assembly comprises a screen, wherein the shaping assembly comprises a mold, wherein the shaping assembly comprises a first portion comprising a screen, wherein the shaping assembly comprises a second portion comprising a backing plate, wherein the first portion and the second portion are adjacent to each other in the application zone, wherein the first portion is abutting the second portion in the application zone, wherein the screen is adjacent the backing plate in the application zone, wherein the backing plate is abutting the screen within the application zone, wherein a surface of the backing plate is configured to contact the mixture in the opening of the screen.

Embodiment 4. The method of embodiment 1, wherein the first portion is translated relative to a die opening in the application zone, wherein the first portion is translated relative to the second portion of the shaping assembly in the application zone, wherein the first portion is translated relative to a direction of extrusion in the application zone, wherein the angle between the direction of translation of the screen and the direction of extrusion is acute, wherein the angle is obtuse, wherein the angle is substantially orthogonal.

Embodiment 5. The method of embodiment 1, wherein at least a portion of the shaping assembly is translated through the application zone, wherein at least a first portion of the shaping assembly is translated through the application zone, wherein the portion of the shaping assembly is translated at a rate of at least about 0.5 mm/sec, at least about 1 cm/sec, at least about 8 cm/sec, and not greater than about 5 m/sec.

Embodiment 6. The method of embodiment 1, wherein applying the mixture comprises depositing the mixture through a process selected from the group consisting of extrusion, printing, spraying, and a combination thereof, wherein the mixture is extruded through a die opening and into an opening in the shaping assembly, wherein during extrusion into the opening, the mixture flows into a first portion of the shaping assembly and abuts a surface of a second portion of the shaping assembly.

Embodiment 7. The method of embodiment 1, further comprising translating at least a portion of the shaping assembly from the application zone to an ejection zone, wherein the shaping assembly comprises a backing plate, and the backing plate is removed in the ejection zone, wherein the backing plate terminates prior to the ejection zone, wherein opposing major surfaces of the mixture are exposed in an opening of a portion of the shaping assembly in the ejection zone.

Embodiment 8. The method of embodiment 1, further comprising separating a first portion of the shaping assembly from a second portion of the shaping assembly, further comprising removing the mixture from at least one surface of a portion of the shaping assembly prior to removing the mixture from the shaping assembly, further comprising removing a backing plate defining a second portion of the shaping assembly from a first portion of the shaping assembly, and removing the mixture from an opening in a second portion of the shaping assembly after removing the backing plate.

Embodiment 9. The method of embodiment 1, wherein ejecting the mixture comprises contacting an exposed major surface of the mixture in an opening of the shaping assembly, wherein ejecting the mixture comprises directly contacts an exposed major surface of the mixture and a portion of the shaping assembly.

Embodiment 10. The method of embodiment 1, wherein the precursor mixture comprises ceramic components, such as, aluminas, boehmites, bayerites, aluminum hydroxides, silicas, titanias, zirconias, and combinations thereof, metal components, such as, transition metals including Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs (i.e., transition metals contained in groups 3-11 of the periodic table) and combinations thereof, alkali and alkaline earth metal components, such as, Li, Be, Na, Mg, K, Ca, Rb, Sr, Cs, Ba, and combinations thereof; alumina, carbon, metal organic framework (MOF) or combinations thereof.

Embodiment 11. The method of embodiment 1, wherein the batch of shaped adsorbent particles comprises a lithium aluminate, wherein the batch of shaped adsorbent particles comprises a 2-layer lithium aluminate, wherein the batch of shaped adsorbent particles comprises $(LiCl)_x \cdot 2Al(OH)_3$, $nH_2O$, wherein the batch of shaped adsorbent particles comprises lithium bayerite.

Embodiment 12. The method of embodiment 1, wherein the batch of shaped adsorbent particles comprises a moisture content of at least about 20 wt. % based on a total weight of the batch of adsorbent particles, such as, at least about 21 wt. % or at least about 22 wt. % or at least about 23 wt. % or at least about 24 wt. % or at least about 25 wt. % or at least about 26 wt. % or at least about 27 wt. % or at least about 28 wt. % or at least about 29 wt. % or at least about 30 wt. % or at least about 31 wt. % or at least about 32 wt. % or at least about 33 wt. % or at least about 34 wt. % or at least about 35 wt. % or at least about 36 wt. % or at least about 37 wt. % or at least about 38 wt. % or at least about 39 wt. % or at least about 40 wt. % or at least about 41 wt. % or at least about 42 wt. % or at least about 43 wt. % or at least about 44 wt. % or at least about 45 wt. %.

Embodiment 13. The method of embodiment 1, wherein the batch of shaped adsorbent particles comprises a moisture content of not greater than about 60 wt. % based on a total weight of the batch of adsorbent particles or not greater than about 58 wt. % or not greater than about 56 wt. % or not greater than about 54 wt. % or not greater than about 52 wt. % or not greater than about 50 wt. %.

Embodiment 14. The method of embodiment 1, wherein the batch of shaped adsorbent particles comprises an envelope density of at least about 0.9 g/cm³.

Embodiment 15. The method of embodiment 1, wherein the batch of shaped adsorbent particles comprises an envelope density of not greater than about 2.0 g/cm³.

Embodiment 16. The method of embodiment 1, wherein the batch of shaped adsorbent particles comprises a plurality of particles having a columnar shape.

Embodiment 17. The method of embodiment 1, wherein the batch of shaped adsorbent particles comprises a plurality of particles having a circular cross-sectional shape.

Embodiment 18. The method of embodiment 1, wherein the batch of shaped adsorbent particles comprises a plurality of particles having an oval cross-sectional shape.

Embodiment 19. The method of embodiment 1, wherein the batch of shaped adsorbent particles comprises a plurality of particles having a polygonal cross-sectional shape.

Embodiment 20. The method of embodiment 1, wherein the batch of shaped adsorbent particles has an average particle diameter of not greater than about 5.0 mm and a particle aspect ratio (L/D) distribution span PARDS of not greater than about 50%, where PARDS is equal to $(AR_{90}-AR_{10})/AR_{50}$, where $AR_{90}$ is equal to a $AR_{90}$ particle aspect ratio (L/D) distribution measurement of the batch of shaped adsorbent particles, $AR_{10}$ is equal to a $AR_{10}$ particle aspect ratio (L/D) distribution measurement, and $AR_{50}$ is equal to a $AR_{50}$ particle aspect ratio (L/D) distribution measurement.

Embodiment 21. The method of embodiment 1, wherein the batch of shaped adsorbent particles has an average particle diameter of not greater than about 5.0 mm, such as, not greater than about 4.5 mm or not greater than about 4.0 mm or not greater than about 3.5 mm or not greater than about 3.0 mm or not greater than about 2.9 mm or not greater than about 2.8 mm or not greater than about 2.7 mm or not greater than about 2.6 mm or not greater than about 2.5 mm or not greater than about 2.4 mm or not greater than about 2.3 mm or not greater than about 2.2 mm or not greater than about 2.1 mm or not greater than about 2.0 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm.

Embodiment 22. The method of embodiment 1, wherein the batch of shaped adsorbent particles has an average particle diameter of at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm.

Embodiment 23. The method of embodiment 1, the batch of shaped adsorbent particles has an average particle length of at least about 0.001 mm or at least about 0.005 mm or at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm.

Embodiment 24. The method of embodiment 1, wherein the batch of shaped adsorbent particles has an average particle length of not greater than about 10 mm or not greater than about 9 mm or not greater than about 8 mm or not greater than about 7 mm or not greater than about 6 mm or not greater than about 5 mm or not greater than about 4 mm or not greater than about 3 mm or not greater than about 2 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm or not greater than about 0.4 mm or not greater than about 0.3 mm or not greater than about 0.2 mm or not greater than about 0.1 .

Embodiment 25. The method of embodiment 1, wherein the batch of shaped adsorbent particles has an average aspect ratio (L/D) of not greater than about 2 or not greater than about 1.9 or not greater than about 1.8 or not greater than about 1.7 or not greater than about 1.6 or not greater than about 1.5 or not greater than about 1.4 or not greater than about 1.3 or not greater than about 1.2 or not greater than about 1.1 or not greater than about 0.9 or not greater than about 0.8 or not greater than about 0.7 or not greater than about 0.6 or not greater than about 0.5.

Embodiment 26. The method of embodiment 1, wherein the batch of shaped adsorbent particles has an average aspect ratio (L/D) of at least about 0.1 or at least about 0.2 or at least about 0.3.

Embodiment 27. A batch of shaped adsorbent particles comprising an average particle diameter of not greater than about 5.0 mm and a particle aspect ratio (L/D) distribution span PARDS of not greater than about 50%, where PARDS is equal to $(AR_{90}-AR_{10})/AR_{50}$, where $AR_{90}$ is equal to a $AR_{90}$ particle aspect ratio (L/D) distribution measurement of the batch of shaped adsorbent particles, $AR_{10}$ is equal to a $AR_{10}$ particle aspect ratio (L/D) distribution measurement, $AR_{50}$ is equal to a $AR_{50}$ particle aspect ratio (L/D) distribution measurement.

Embodiment 28. The batch of shaped adsorbent particles of embodiment 27, wherein the batch of shaped adsorbent particles comprises a lithium aluminate, wherein the batch of shaped adsorbent particles comprises a 2-layer lithium aluminate, wherein the batch of shaped adsorbent particles comprises $(LiCl)_x \cdot 2Al(OH)_3 \cdot nH_2O$, wherein the batch of shaped adsorbent particles comprises Li Bayerite.

Embodiment 29. The batch of shaped adsorbent particles of embodiment 27, wherein the batch of shaped adsorbent particles comprises a moisture content of at least about 20 wt. % based on a total weight of the batch of adsorbent particles, such as, at least about 21 wt. % or at least about 22 wt. % or at least about 23 wt. % or at least about 24 wt. % or at least about 25 wt. % or at least about 26 wt. % or at least about 27 wt. % or at least about 28 wt. % or at least about 29 wt. % or at least about 30 wt. % or at least about 31 wt. % or at least about 32 wt. % or at least about 33 wt. % or at least about 34 wt. % or at least about 35 wt. % or at least about 36 wt. % or at least about 37 wt. % or at least about 38 wt. % or at least about 39 wt. % or at least about 40 wt. % or at least about 41 wt. % or at least about 42 wt. % or at least about 43 wt. % or at least about 44 wt. % or at least about 45 wt. %.

Embodiment 30. The batch of shaped adsorbent particles of embodiment 27, wherein the batch of shaped adsorbent particles comprises a moisture content of not greater than about 60 wt. % based on a total weight of the batch of adsorbent particles or not greater than about 58 wt. % or not greater than about 56 wt. % or not greater than about 54 wt. % or not greater than about 52 wt. % or not greater than about 50 wt. %.

Embodiment 31. The batch of shaped adsorbent particles of embodiment 27, wherein the batch of shaped adsorbent particles comprises an envelope density of at least about 0.9 g/cm³.

Embodiment 32. The batch of shaped adsorbent particles of embodiment 27, wherein the batch of shaped adsorbent particles comprises an envelope density of not greater than about 2.0 g/cm³.

Embodiment 33. The batch of shaped adsorbent particles of embodiment 27, wherein the batch of shaped adsorbent particles comprises a plurality of particles having a columnar shape.

Embodiment 34. The batch of shaped adsorbent particles of embodiment 27, wherein the batch of shaped adsorbent particles comprises a plurality of particles having a circular cross-sectional shape.

Embodiment 35. The batch of shaped adsorbent particles of embodiment 27, wherein the batch of shaped adsorbent particles comprises a plurality of particles having an oval cross-sectional shape.

Embodiment 36. The batch of shaped adsorbent particles of embodiment 27, wherein the batch of shaped adsorbent particles comprises a plurality of particles having a polygonal cross-sectional shape.

Embodiment 37. The batch of shaped adsorbent particles of embodiment 27, wherein the batch of shaped adsorbent particles has an average particle diameter of not greater than about 5.0 mm, such as, not greater than about 4.5 mm or not greater than about 4.0 mm or not greater than about 3.5 mm or not greater than about 3.0 mm or not greater than about 2.9 mm or not greater than about 2.8 mm or not greater than about 2.7 mm or not greater than about 2.6 mm or not greater than about 2.5 mm or not greater than about 2.4 mm or not greater than about 2.3 mm or not greater than about 2.2 mm or not greater than about 2.1 mm or not greater than about 2.0 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm.

Embodiment 38. The batch of shaped adsorbent particles of embodiment 27, wherein the batch of shaped adsorbent particles has an average particle diameter of at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm.

Embodiment 39. The batch of shaped adsorbent particles of embodiment 27, wherein the batch of shaped adsorbent particles has an average particle length of at least about 0.001 mm or at least about 0.005 mm or at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm.

Embodiment 40. The batch of shaped adsorbent particles of embodiment 27, wherein the batch of shaped adsorbent particles has an average particle length of not greater than about 10 mm or not greater than about 9 mm or not greater than about 8 mm or not greater than about 7 mm or not greater than about 6 mm or not greater than about 5 mm or not greater than about 4 mm or not greater than about 3 mm or not greater than about 2 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm or not greater than about 0.4 mm or not greater than about 0.3 mm or not greater than about 0.2 mm or not greater than about 0.1.

Embodiment 41. The batch of shaped adsorbent particles of embodiment 27, wherein the batch of shaped adsorbent particles has an average aspect ratio (L/D) of not greater than about 2 or not greater than about 1.9 or not greater than about 1.8 or not greater than about 1.7 or not greater than about 1.6 or not greater than about 1.5 or not greater than about 1.4 or not greater than about 1.3 or not greater than about 1.2 or not greater than about 1.1 or not greater than about 0.9 or not greater than about 0.8 or not greater than about 0.7 or not greater than about 0.6 or not greater than about 0.5.

Embodiment 42. The batch of shaped adsorbent particles of embodiment 27, wherein the batch of shaped adsorbent particles has an average aspect ratio (L/D) of at least about 0.1 or at least about 0.2 or at least about 0.3.

Embodiment 43. A system for forming a batch of shaped adsorbent particles, wherein the system comprises: an application zone comprising a shaping assembly including a first portion having an opening and configured to be filled with a precursor mixture to form a batch of precursor shaped adsorbent particles, and a second portion abutting the first portion; a drying zone comprising a first heat source and being configured to dry the batch of precursor shaped adsorbent particles to form the batch of shaped adsorbent particle; and an ejection zone comprising an ejection assembly configured to remove the batch of shaped adsorbent particles from the shaping assembly.

Embodiment 44. The system of embodiment 43, wherein the precursor mixture comprises ceramic components, such as, aluminas, boehmites, bayerites, aluminum hydroxides, silicas, titanias, zirconias, and combinations thereof, metal components, such as, transition metals including Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs (i.e., transition metals contained in groups 3-11 of the periodic table) and combinations thereof, alkali and alkaline earth metal components, such as, Li, Be, Na, Mg, K, Ca, Rb, Sr, Cs, Ba, and combinations thereof; alumina, carbon, metal organic framework (MOF) or combinations thereof.

Embodiment 45. The system of embodiment 43, wherein the batch of shaped adsorbent particles comprises a lithium aluminate, wherein the batch of shaped adsorbent particles comprises a 2-layer lithium aluminate, wherein the batch of shaped adsorbent particles comprises $(LiCl)_x.2Al(OH)_3, nH_2O$, wherein the batch of shaped adsorbent particles comprises Li Bayerite.

Embodiment 46. The system of embodiment 43, wherein the batch of shaped adsorbent particles comprises a moisture content of at least about 20 wt. % based on a total weight of the batch of adsorbent particles, such as, at least about 21 wt. % or at least about 22 wt. % or at least about 23 wt. % or at least about 24 wt. % or at least about 25 wt. % or at least about 26 wt. % or at least about 27 wt. % or at least about 28 wt. % or at least about 29 wt. % or at least about 30 wt. % or at least about 31 wt. % or at least about 32 wt. % or at least about 33 wt. % or at least about 34 wt. % or at least about 35 wt. % or at least about 36 wt. % or at least about 37 wt. % or at least about 38 wt. % or at least about 39 wt. % or at least about 40 wt. % or at least about 41 wt. % or at least about 42 wt. % or at least about 43 wt. % or at least about 44 wt. % or at least about 45 wt. %.

Embodiment 47. The system of embodiment 43, wherein the batch of shaped adsorbent particles comprises a moisture content of not greater than about 60 wt. % based on a total weight of the batch of adsorbent particles or not greater than about 58 wt. % or not greater than about 56 wt. % or not greater than about 54 wt. % or not greater than about 52 wt. % or not greater than about 50 wt. %.

Embodiment 48. The system of embodiment 43, wherein the batch of shaped adsorbent particles comprises an envelope density of at least about 0.9 g/cm³.

Embodiment 49. The system of embodiment 43, wherein the batch of shaped adsorbent particles comprises an envelope density of not greater than about 2.0 g/cm³.

Embodiment 50. The system of embodiment 43, wherein the batch of shaped adsorbent particles comprises a plurality of particles having a columnar shape.

Embodiment 51. The system of embodiment 43, wherein the batch of shaped adsorbent particles comprises a plurality of particles having a circular cross-sectional shape.

Embodiment 52. The system of embodiment 43, wherein the batch of shaped adsorbent particles comprises a plurality of particles having an oval cross-sectional shape.

Embodiment 53. The system of embodiment 43, wherein the batch of shaped adsorbent particles comprises a plurality of particles having a polygonal cross-sectional shape.

Embodiment 54. The system of embodiment 43, wherein the batch of shaped adsorbent particles has a particle aspect ratio (L/D) distribution span PARDS of not greater than about 50%, where PARDS is equal to $(AR_{90}-AR_{10})/AR_{50}$, where $AR_{90}$ is equal to a $AR_{90}$ particle aspect ratio (L/D) distribution measurement of the batch of shaped adsorbent particles, $AR_{10}$ is equal to a $AR_{10}$ particle aspect ratio (L/D) distribution measurement, $AR_{50}$ is equal to a $AR_{50}$ particle aspect ratio (L/D) distribution measurement.

Embodiment 55. The system of embodiment 43, wherein the batch of shaped adsorbent particles has an average particle diameter of not greater than about 5.0 mm, such as, not greater than about 4.5 mm or not greater than about 4.0 mm or not greater than about 3.5 mm or not greater than about 3.0 mm or not greater than about 2.9 mm or not greater than about 2.8 mm or not greater than about 2.7 mm or not greater than about 2.6 mm or not greater than about 2.5 mm or not greater than about 2.4 mm or not greater than about 2.3 mm or not greater than about 2.2 mm or not greater than about 2.1 mm or not greater than about 2.0 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm.

Embodiment 56. The system of embodiment 43, wherein the batch of shaped adsorbent particles has an average particle diameter of at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm.

Embodiment 57. The system of embodiment 43, the batch of shaped adsorbent particles has an average particle length of at least about 0.001 mm or at least about 0.005 mm or at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm.

Embodiment 58. The system of embodiment 43, wherein the batch of shaped adsorbent particles has an average particle length of not greater than about 10 mm or not greater than about 9 mm or not greater than about 8 mm or not greater than about 7 mm or not greater than about 6 mm or not greater than about 5 mm or not greater than about 4 mm or not greater than about 3 mm or not greater than about 2 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm or not greater than about 0.4 mm or not greater than about 0.3 mm or not greater than about 0.2 mm or not greater than about 0.1.

Embodiment 59. The system of embodiment 43, wherein the batch of shaped adsorbent particles has an average aspect ratio (L/D) of not greater than about 2 or not greater than about 1.9 or not greater than about 1.8 or not greater than about 1.7 or not greater than about 1.6 or not greater than about 1.5 or not greater than about 1.4 or not greater than about 1.3 or not greater than about 1.2 or not greater than about 1.1 or not greater than about 0.9 or not greater than about 0.8 or not greater than about 0.7 or not greater than about 0.6 or not greater than about 0.5.

Embodiment 60. The system of embodiment 43, wherein the batch of shaped adsorbent particles has an average aspect ratio (L/D) of at least about 0.1 or at least about 0.2 or at least about 0.3.

Embodiment 61. A method of forming a batch of shaped lithium bayerite adsorbent particles, wherein the method comprises: applying a lithium bayerite precursor mixture into a shaping assembly within an application zone to form a batch of precursor shaped lithium bayerite adsorbent particles; drying the batch of precursor shaped lithium bayerite adsorbent particles within the shaping assembly to form the batch of shaped lithium bayerite adsorbent particles; and ejecting the batch of shaped lithium bayerite adsorbent particles from the shaping assembly, wherein the batch of shaped lithium bayerite adsorbent particles comprises a moisture content of at least about 20 wt. %.

Embodiment 62. The method of embodiment 61, wherein applying the lithium bayerite precursor mixture into a shaping assembly comprises extruding the lithium bayerite precursor mixture through a die opening and into the shaping assembly, wherein the shaping assembly comprises an opening configured to receive the lithium bayerite precursor mixture, wherein the opening is defined by at least three surfaces, wherein the opening extends through an entire thickness of a first portion of the shaping assembly, wherein the opening extends through an entire thickness of the shaping assembly, wherein the opening extends through a portion of an entire thickness of the shaping assembly.

Embodiment 63. The method of embodiment 61, wherein the shaping assembly comprises a screen, wherein the shaping assembly comprises a mold, wherein the shaping assembly comprises a first portion comprising a screen, wherein the shaping assembly comprises a second portion comprising a backing plate, wherein the first portion and the second portion are adjacent to each other in the application zone, wherein the first portion is abutting the second portion in the application zone, wherein the screen is adjacent the backing plate in the application zone, wherein the positioned adjacent to the screen, wherein the backing plate is abutting the screen within the application zone, wherein a surface of the backing plate is configured to contact the mixture in the opening of the screen.

Embodiment 64. The method of embodiment 61, wherein the first portion is translated relative to a die opening in the application zone, wherein the first portion is translated relative to the second portion of the shaping assembly in the application zone, wherein the first portion is translated relative to a direction of extrusion in the application zone, wherein the angle between the direction of translation of the screen and the direction of extrusion is acute, wherein the angle is obtuse, wherein the angle is substantially orthogonal.

Embodiment 65. The method of embodiment 61, wherein at least a portion of the shaping assembly is translated through the application zone, wherein at least a first portion of the shaping assembly is translated through the application zone, wherein the portion of the shaping assembly is translated at a rate of at least about 0.5 mm/sec, at least about 1 cm/sec, at least about 8 cm/sec, and not greater than about 5 m/sec.

Embodiment 66. The method of embodiment 61, wherein applying the mixture comprises depositing the mixture through a process selected from the group consisting of extrusion, printing, spraying, and a combination thereof, wherein the mixture is extruded through a die opening and into an opening in the shaping assembly, wherein during extrusion into the opening, the mixture flows into a first portion of the shaping assembly and abuts a surface of a second portion of the shaping assembly.

Embodiment 67. The method of embodiment 61, further comprising translating at least a portion of the shaping assembly from the application zone to an ejection zone, wherein the shaping assembly comprises a backing plate, and the backing plate is removed in the ejection zone, wherein the backing plate terminates prior to the ejection zone, wherein opposing major surfaces of the mixture are exposed in an opening of a portion of the shaping assembly in the ejection zone.

Embodiment 68. The method of embodiment 61, further comprising separating a first portion of the shaping assembly from a second portion of the shaping assembly, further comprising removing the mixture from at least one surface of a portion of the shaping assembly prior to removing the mixture from the shaping assembly, further comprising removing a backing plate defining a second portion of the shaping assembly from a first portion of the shaping assembly, and removing the mixture from an opening in a second portion of the shaping assembly after removing the backing plate.

Embodiment 69. The method of embodiment 61, wherein ejecting the material comprises directly contacting an exposed major surface of the mixture in an opening of the shaping assembly, wherein ejecting the material comprises directly contacting an exposed major surface of the mixture and a portion of the shaping assembly.

Embodiment 70. The method of embodiment 61, wherein the lithium bayerite precursor mixture comprises a hydrated material of formula $(LiCl)_x.2Al(OH)_3.nH_2O$, the lithium bayerite precursor mixture may further comprise oxalic acid in concentration of 0-5 weight percent relative to the dry weight of the bayerite phase.

Embodiment 71. The method of embodiment 61, wherein the batch of shaped lithium bayerite adsorbent particles comprises a lithium aluminate, wherein the batch of shaped lithium bayerite adsorbent particles comprises a 2-layer lithium aluminate, wherein the batch of shaped lithium bayerite adsorbent particles comprises $(LiCl)_x.2Al(OH)_3.nH_2O$, wherein the batch of shaped lithium bayerite adsorbent particles comprises Li Bayerite.

Embodiment 72. The method of embodiment 61, wherein the batch of shaped lithium bayerite adsorbent particles comprises a moisture content of at least about 20 wt. % based on a total weight of the batch of adsorbent particles, such as, at least about 21 wt. % or at least about 22 wt. % or at least about 23 wt. % or at least about 24 wt. % or at least about 25 wt. % or at least about 26 wt. % or at least about 27 wt. % or at least about 28 wt. % or at least about 29 wt. % or at least about 30 wt. % or at least about 31 wt. % or at least about 32 wt. % or at least about 33 wt. % or at least about 34 wt. % or at least about 35 wt. % or at least about 36 wt. % or at least about 37 wt. % or at least about 38 wt. % or at least about 39 wt. % or at least about 40 wt. % or at least about 41 wt. % or at least about 42 wt. % or at least about 43 wt. % or at least about 44 wt. % or at least about 45 wt. %.

Embodiment 73. The method of embodiment 61, wherein the batch of shaped lithium bayerite adsorbent particles comprises a moisture content of not greater than about 60 wt. % based on a total weight of the batch of shaped lithium bayerite adsorbent particles or not greater than about 58 wt.

% or not greater than about 56 wt. % or not greater than about 54 wt. % or not greater than about 52 wt. % or not greater than about 50 wt. %.

Embodiment 74. The method of embodiment 61, wherein the batch of shaped lithium bayerite adsorbent particles comprises an envelope density of at least about 0.9 g/cm$^3$.

Embodiment 75. The method of embodiment 1, wherein the batch of shaped lithium bayerite adsorbent particles comprises an envelope density of not greater than about 2.0 g/cm$^3$.

Embodiment 76. The method of embodiment 61, wherein the batch of shaped lithium bayerite adsorbent particles comprises a plurality of particles having a columnar shape.

Embodiment 77. The method of embodiment 61, wherein the batch of shaped lithium bayerite adsorbent particles comprises a plurality of particles having a circular cross-sectional shape.

Embodiment 78. The method of embodiment 61, wherein the batch of shaped lithium bayerite adsorbent particles comprises a plurality of particles having an oval cross-sectional shape.

Embodiment 79. The method of embodiment 61, wherein the batch of shaped lithium bayerite adsorbent particles comprises a plurality of particles having a polygonal cross-sectional shape.

Embodiment 80. The method of embodiment 61, wherein the batch of shaped lithium bayerite adsorbent particles has an average particle diameter of not greater than about 5.0 mm and a particle aspect ratio (L/D) distribution span PARDS of not greater than about 50%, where PARDS is equal to $(AR_{90}-AR_{10})/AR_{50}$, where $AR_{90}$ is equal to a $AR_{90}$ particle aspect ratio (L/D) distribution measurement of the batch of shaped lithium bayerite adsorbent particles, $AR_{10}$ is equal to a $AR_{10}$ particle aspect ratio (L/D) distribution measurement, $AR_{50}$ is equal to a $AR_{50}$ particle aspect ratio (L/D) distribution measurement.

Embodiment 81. The method of embodiment 61, wherein the batch of shaped lithium bayerite adsorbent particles has an average particle diameter of not greater than about 5.0 mm, such as, not greater than about 4.5 mm or not greater than about 4.0 mm or not greater than about 3.5 mm or not greater than about 3.0 mm or not greater than about 2.9 mm or not greater than about 2.8 mm or not greater than about 2.7 mm or not greater than about 2.6 mm or not greater than about 2.5 mm or not greater than about 2.4 mm or not greater than about 2.3 mm or not greater than about 2.2 mm or not greater than about 2.1 mm or not greater than about 2.0 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm.

Embodiment 82. The method of embodiment 61, wherein the batch of shaped lithium bayerite adsorbent particles has an average particle diameter of at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm.

Embodiment 83. The method of embodiment 61, the batch of shaped lithium bayerite adsorbent particles has an average particle length of at least about 0.001 mm or at least about 0.005 mm or at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm.

Embodiment 84. The method of embodiment 61, wherein the batch of shaped lithium bayerite adsorbent particles has an average particle length of not greater than about 10 mm or not greater than about 9 mm or not greater than about 8 mm or not greater than about 7 mm or not greater than about 6 mm or not greater than about 5 mm or not greater than about 4 mm or not greater than about 3 mm or not greater than about 2 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm or not greater than about 0.4 mm or not greater than about 0.3 mm or not greater than about 0.2 mm or not greater than about 0.1.

Embodiment 85. The method of embodiment 61, wherein the batch of shaped lithium bayerite adsorbent particles has an average aspect ratio (L/D) of not greater than about 2 or not greater than about 1.9 or not greater than about 1.8 or not greater than about 1.7 or not greater than about 1.6 or not greater than about 1.5 or not greater than about 1.4 or not greater than about 1.3 or not greater than about 1.2 or not greater than about 1.1 or not greater than about 0.9 or not greater than about 0.8 or not greater than about 0.7 or not greater than about 0.6 or not greater than about 0.5.

Embodiment 86. The method of embodiment 61, wherein the batch of shaped lithium bayerite adsorbent particles has an average aspect ratio (L/D) of at least about 0.1 or at least about 0.2 or at least about 0.3.

Embodiment 87. A batch of shaped lithium bayerite adsorbent particles comprising an average particle diameter of not greater than about 5.0 mm and a particle aspect ratio (L/D) distribution span PARDS of not greater than about 50%, where PARDS is equal to $(AR_{90}-AR_{10})/AR_{50}$, where $AR_{90}$ is equal to a $AR_{90}$ particle aspect ratio (L/D) distribution measurement of the batch of shaped lithium bayerite adsorbent particles, $AR_{10}$ is equal to a $AR_{10}$ particle aspect ratio (L/D) distribution measurement, and $AR_{50}$ is equal to a $AR_{50}$ particle aspect ratio (L/D) distribution measurement.

Embodiment 88. The batch of shaped lithium bayerite adsorbent particles of embodiment 87, wherein the batch of shaped lithium bayerite adsorbent particles comprises a lithium aluminate, wherein the batch of shaped lithium bayerite adsorbent particles comprises a 2-layer lithium aluminate, wherein the batch of shaped lithium bayerite adsorbent particles comprises $(LiCl)_x \cdot 2Al(OH)_3 \cdot nH_2O$, wherein the batch of shaped lithium bayerite adsorbent particles comprises Li Bayerite.

Embodiment 89. The batch of shaped lithium bayerite adsorbent particles of embodiment 87, wherein the batch of shaped lithium bayerite adsorbent particles comprises a moisture content of at least about 20 wt. % based on a total weight of the batch of adsorbent particles, such as, at least about 21 wt. % or at least about 22 wt. % or at least about 23 wt. % or at least about 24 wt. % or at least about 25 wt. % or at least about 26 wt. % or at least about 27 wt. % or at least about 28 wt. % or at least about 29 wt. % or at least about 30 wt. % or at least about 31 wt. % or at least about 32 wt. % or at least about 33 wt. % or at least about 34 wt. % or at least about 35 wt. % or at least about 36 wt. % or at least about 37 wt. % or at least about 38 wt. % or at least about 39 wt. % or at least about 40 wt. % or at least about 41 wt. % or at least about 42 wt. % or at least about 43 wt. % or at least about 44 wt. % or at least about 45 wt. %.

Embodiment 90. The batch of shaped lithium bayerite adsorbent particles of embodiment 87, wherein the batch of shaped lithium bayerite adsorbent particles comprises a moisture content of not greater than about 60 wt. % based on a total weight of the batch of shaped lithium bayerite adsorbent particles or not greater than about 58 wt. % or not greater than about 56 wt. % or not greater than about 54 wt. % or not greater than about 52 wt. % or not greater than about 50 wt. %.

Embodiment 91. The batch of shaped lithium bayerite adsorbent particles of embodiment 87, wherein the batch of shaped lithium bayerite adsorbent particles comprises an envelope density of at least about 0.9 g/cm³.

Embodiment 92. The batch of shaped lithium bayerite adsorbent particles of embodiment 87, wherein the batch of shaped lithium bayerite adsorbent particles comprises an envelope density of not greater than about 2.0 g/cm³.

Embodiment 93. The batch of shaped lithium bayerite adsorbent particles of embodiment 87, wherein the batch of shaped lithium bayerite adsorbent particles comprises a plurality of particles having a columnar shape.

Embodiment 94. The batch of shaped lithium bayerite adsorbent particles of embodiment 87, wherein the batch of shaped lithium bayerite adsorbent particles comprises a plurality of particles having a circular cross-sectional shape.

Embodiment 95. The batch of shaped lithium bayerite adsorbent particles of embodiment 87, wherein the batch of shaped lithium bayerite adsorbent particles comprises a plurality of particles having an oval cross-sectional shape.

Embodiment 96. The batch of shaped lithium bayerite adsorbent particles of embodiment 87, wherein the batch of shaped lithium bayerite adsorbent particles comprises a plurality of particles having a polygonal cross-sectional shape.

Embodiment 97. The batch of shaped lithium bayerite adsorbent particles of embodiment 87, wherein the batch of shaped lithium bayerite adsorbent particles has an average particle diameter of not greater than about 5.0 mm, such as, not greater than about 4.5 mm or not greater than about 4.0 mm or not greater than about 3.5 mm or not greater than about 3.0 mm or not greater than about 2.9 mm or not greater than about 2.8 mm or not greater than about 2.7 mm or not greater than about 2.6 mm or not greater than about 2.5 mm or not greater than about 2.4 mm or not greater than about 2.3 mm or not greater than about 2.2 mm or not greater than about 2.1 mm or not greater than about 2.0 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm.

Embodiment 98. The batch of shaped lithium bayerite adsorbent particles of embodiment 87, wherein the batch of shaped lithium bayerite adsorbent particles has an average particle diameter of at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm.

Embodiment 99. The batch of shaped lithium bayerite adsorbent particles of embodiment 87, wherein the batch of shaped lithium bayerite adsorbent particles has an average particle length of at least about 0.001 mm or at least about 0.005 mm or at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm.

Embodiment 100. The batch of shaped lithium bayerite adsorbent particles of embodiment 87, wherein the batch of shaped lithium bayerite adsorbent particles has an average particle length of not greater than about 10 mm or not greater than about 9 mm or not greater than about 8 mm or not greater than about 7 mm or not greater than about 6 mm or not greater than about 5 mm or not greater than about 4 mm or not greater than about 3 mm or not greater than about 2 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm or not greater than about 0.4 mm or not greater than about 0.3 mm or not greater than about 0.2 mm or not greater than about 0.1.

Embodiment 101. The batch of shaped lithium bayerite adsorbent particles of embodiment 87, wherein the batch of shaped lithium bayerite adsorbent particles has an average aspect ratio (L/D) of not greater than about 2 or not greater than about 1.9 or not greater than about 1.8 or not greater than about 1.7 or not greater than about 1.6 or not greater than about 1.5 or not greater than about 1.4 or not greater than about 1.3 or not greater than about 1.2 or not greater than about 1.1 or not greater than about 0.9 or not greater than about 0.8 or not greater than about 0.7 or not greater than about 0.6 or not greater than about 0.5.

Embodiment 102. The batch of shaped lithium bayerite adsorbent particles of embodiment 87, wherein the batch of shaped lithium bayerite adsorbent particles has an average aspect ratio (L/D) of at least about 0.1 or at least about 0.2 or at least about 0.3.

Embodiment 103. A system for forming a batch of shaped lithium bayerite adsorbent particles, wherein the system comprises: an application zone comprising a shaping assembly including: a first portion having an opening and configured to be filled with a lithium bayerite precursor mixture to form a batch of precursor shaped lithium bayerite adsorbent particles; a second portion abutting the first portion; a drying zone comprising a first heat source and configure to dry the batch of precursor shaped lithium bayerite adsorbent particles to form the batch of shaped lithium bayerite adsorbent particle; and an ejection zone comprising an ejection assembly configured eject the batch of shaped lithium bayerite adsorbent particles from the shaping assembly.

Embodiment 104. The system of embodiment 103, wherein the lithium bayerite precursor mixture comprises a hydrated material of formula $(LiCl)_x \cdot 2Al(OH)_3 \cdot nH_2O$, the lithium bayerite precursor mixture may further comprise oxalic acid in concentration of 0-5 weight percent relative to the dry weight of the bayerite phase.

Embodiment 105. The system of embodiment 103, wherein the batch of shaped lithium bayerite adsorbent particles comprises a lithium aluminate, wherein the batch of shaped lithium bayerite adsorbent particles comprises a 2-layer lithium aluminate, wherein the batch of shaped lithium bayerite adsorbent particles comprises $(LiCl)_x \cdot 2Al(OH)_3 \cdot nH_2O$, wherein the batch of shaped lithium bayerite adsorbent particles comprises Li Bayerite.

Embodiment 106. The system of embodiment 103, wherein the batch of shaped lithium bayerite adsorbent particles comprises a moisture content of at least about 20 wt. % based on a total weight of the batch of adsorbent particles, such as, at least about 21 wt. % or at least about 22 wt. % or at least about 23 wt. % or at least about 24 wt. % or at least about 25 wt. % or at least about 26 wt. % or at least about 27 wt. % or at least about 28 wt. % or at least about 29 wt. % or at least about 30 wt. % or at least about 31 wt. % or at least about 32 wt. % or at least about 33 wt. % or at least about 34 wt. % or at least about 35 wt. % or at least about 36 wt. % or at least about 37 wt. % or at least about 38 wt. % or at least about 39 wt. % or at least about 40 wt. % or at least about 41 wt. % or at least about 42 wt. % or at least about 43 wt. % or at least about 44 wt. % or at least about 45 wt. %.

Embodiment 107. The system of embodiment 103, wherein the batch of shaped lithium bayerite adsorbent particles comprises a moisture content of not greater than about 60 wt. % based on a total weight of the batch of lithium bayerite adsorbent particles or not greater than about 58 wt. % or not greater than about 56 wt. % or not greater than about 54 wt. % or not greater than about 52 wt. % or not greater than about 50 wt. %.

Embodiment 108. The system of embodiment 103, wherein the batch of shaped lithium bayerite adsorbent particles comprises an envelope density of at least about 0.9 g/cm³.

Embodiment 109. The system of embodiment 103, wherein the batch of shaped lithium bayerite adsorbent particles comprises an envelope density of not greater than about 2.0 g/cm³.

Embodiment 110. The system of embodiment 103, wherein the batch of shaped lithium bayerite adsorbent particles comprises a plurality of particles having a columnar shape.

Embodiment 111. The system of embodiment 103, wherein the batch of shaped lithium bayerite adsorbent particles comprises a plurality of particles having a circular cross-sectional shape.

Embodiment 112. The system of embodiment 103, wherein the batch of shaped lithium bayerite adsorbent particles comprises a plurality of particles having an oval cross-sectional shape.

Embodiment 113. The system of embodiment 103, wherein the batch of shaped lithium bayerite adsorbent particles comprises a plurality of particles having a polygonal cross-sectional shape.

Embodiment 114. The system of embodiment 103, wherein the batch of shaped lithium bayerite adsorbent particles has a particle aspect ratio (L/D) distribution span PARDS of not greater than about 50%, where PARDS is equal to $(AR_{90}-AR_{10})/AR_{50}$, where $AR_{90}$ is equal to a $AR_{90}$ particle aspect ratio (L/D) distribution measurement of the batch of shaped lithium bayerite adsorbent particles, $AR_{10}$ is equal to a $AR_{10}$ particle aspect ratio (L/D) distribution measurement, and a $AR_{50}$ is equal to a $AR_{50}$ particle aspect ratio (L/D) distribution measurement.

Embodiment 115. The system of embodiment 103, wherein the batch of shaped lithium bayerite adsorbent particles has an average particle diameter of not greater than about 5.0 mm, such as, not greater than about 4.5 mm or not greater than about 4.0 mm or not greater than about 3.5 mm or not greater than about 3.0 mm or not greater than about 2.9 mm or not greater than about 2.8 mm or not greater than about 2.7 mm or not greater than about 2.6 mm or not greater than about 2.5 mm or not greater than about 2.4 mm or not greater than about 2.3 mm or not greater than about 2.2 mm or not greater than about 2.1 mm or not greater than about 2.0 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm.

Embodiment 116. The system of embodiment 103, wherein the batch of shaped lithium bayerite adsorbent particles has an average particle diameter of at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm.

Embodiment 117. The system of embodiment 103, the batch of shaped lithium bayerite adsorbent particles has an average particle length of at least about 0.001 mm or at least about 0.005 mm or at least about 0.01 mm or at least about 0.02 mm or at least about 0.03 mm or at least about 0.04 mm or at least about 0.05 mm or at least about 0.06 mm or at least about 0.07 mm or at least about 0.08 mm or at least about 0.09 mm or at least about 0.1 mm or at least about 0.2 mm or at least about 0.3 mm.

Embodiment 118. The system of embodiment 103, wherein the batch of shaped lithium bayerite adsorbent particles has an average particle length of not greater than about 10 mm or not greater than about 9 mm or not greater than about 8 mm or not greater than about 7 mm or not greater than about 6 mm or not greater than about 5 mm or not greater than about 4 mm or not greater than about 3 mm or not greater than about 2 mm or not greater than about 1.9 mm or not greater than about 1.8 mm or not greater than about 1.7 mm or not greater than about 1.6 mm or not greater than about 1.5 mm or not greater than about 1.4 mm or not greater than about 1.3 mm or not greater than about 1.2 mm or not greater than about 1.1 mm or not greater than about 1.0 mm or not greater than about 0.9 mm or not greater than about 0.8 mm or not greater than about 0.7 mm or not greater than about 0.6 mm or not greater than about 0.5 mm or not greater than about 0.4 mm or not greater than about 0.3 mm or not greater than about 0.2 mm or not greater than about 0.1.

Embodiment 119. The system of embodiment 103, wherein the batch of shaped lithium bayerite adsorbent particles has an average aspect ratio (L/D) of not greater than about 2 or not greater than about 1.9 or not greater than about 1.8 or not greater than about 1.7 or not greater than about 1.6 or not greater than about 1.5 or not greater than about 1.4 or not greater than about 1.3 or not greater than about 1.2 or not greater than about 1.1 or not greater than about 0.9 or not greater than about 0.8 or not greater than about 0.7 or not greater than about 0.6 or not greater than about 0.5.

Embodiment 120. The system of embodiment 103, wherein the batch of shaped lithium bayerite adsorbent particles has an average aspect ratio (L/D) of at least about 0.1 or at least about 0.2 or at least about 0.3.

Embodiment 121. The method of embodiment 1, wherein the shaped adsorbent particles of the batch of shaped adsorbent particles are porous solid particles configured for uptake and immobilization of a species from a surrounding medium by one or more adsorption processes.

Embodiment 122. The method of embodiment 121, wherein the shaped adsorbent particles of the batch of shaped adsorbent particles are further configured for desorption of the species from the surrounding medium subsequent to uptake and immobilization of the species.

Embodiments 123. The method of embodiment 1, wherein the shaped adsorbent particles are not configured for use as abrasive particles.

Embodiments 124. The method of embodiment 1, wherein the shaped adsorbent particles are not abrasive particles.

Embodiments 125. The method of embodiment 1, wherein the shaped adsorbent particles can not be configured for use in material removal through a grinding operation.

Embodiments 126. The method of embodiment 1, wherein the shaped adsorbent particles can not be configured for use in material removal through a grinding operation of a workpiece having a Vickers hardness of at least about 5 GPa, at least about 10 GPa, at least about 11 GPa.

Embodiments 127. The method of embodiment 1, wherein the shaped adsorbent particles have a hardness that not greater than a hardness of abrasive particles.

Embodiments 128. The method of embodiment 1, wherein the shaped adsorbent particles have a Mohs hardness that not greater than a Mohs hardness of abrasive particles.

Embodiments 129. The method of embodiment 1, wherein the shaped adsorbent particles have a Mohs hardness of not greater than about 7, not greater than about 6, not greater than about 5, not greater than about 4, not greater than about 3, not greater than about 2, not greater than about 1.

Embodiments 130. The method of embodiment 1, wherein the shaped adsorbent particles have a Vickers hardness that not greater than a Vickers hardness of abrasive particles.

Embodiments 131. The method of embodiment 1, wherein the shaped adsorbent particles have a Vickers hardness of not greater than about 11 GPa, not greater than about 10 GPa, not greater than about 5 GPa.

Embodiment 132. The batch of shaped adsorbent particles of embodiment 27, wherein the shaped adsorbent particles of the batch of shaped adsorbent particles are porous solid particles configured for uptake and immobilization of a species from a surrounding medium by one or more adsorption processes.

Embodiment 133. The batch of shaped adsorbent particles of embodiment 132, wherein the shaped adsorbent particles of the batch of shaped adsorbent particles are further configured for desorption of the species from the surrounding medium subsequent to uptake and immobilization of the species.

Embodiments 134. The batch of shaped adsorbent particles of embodiment 27, wherein the shaped adsorbent particles are not configured for use as abrasive particles.

Embodiments 135. The batch of shaped adsorbent particles of embodiment 27, wherein the shaped adsorbent particles are not abrasive particles.

Embodiments 136. The batch of shaped adsorbent particles of embodiment 27, wherein the shaped adsorbent particles can not be configured for use in material removal through a grinding operation.

Embodiments 137. The batch of shaped adsorbent particles of embodiment 27, wherein the shaped adsorbent particles can not be configured for use in material removal through a grinding operation of a workpiece having a Vickers hardness of at least about 11 GPa, at least about 10 GPa, at least about 5 GPa.

Embodiments 138. The batch of shaped adsorbent particles of embodiment 27, wherein the shaped adsorbent particles have a hardness that not greater than a hardness of abrasive particles.

Embodiments 139. The batch of shaped adsorbent particles of embodiment 27, wherein the shaped adsorbent particles have a Mohs hardness that not greater than a Mohs hardness of abrasive particles.

Embodiments 140. The batch of shaped adsorbent particles of embodiment 27, wherein the shaped adsorbent particles have a Mohs hardness of not greater than about 7, not greater than about 6, not greater than about 5, not greater than about 4, not greater than about 3, not greater than about 2, not greater than about 1.

Embodiments 141. The batch of shaped adsorbent particles of embodiment 27, wherein the shaped adsorbent particles have a Vickers hardness that not greater than a Vickers hardness of abrasive particles.

Embodiments 142. The batch of shaped adsorbent particles of embodiment 27, wherein the shaped adsorbent particles have a Vickers hardness of not greater than about 11 GPa, not greater than about 10 GPa, not greater than about 5 GPa.

Embodiment 143. The system of embodiment 43, wherein the shaped adsorbent particles of the batch of shaped adsorbent particles are porous solid particles configured for uptake and immobilization of a species from a surrounding medium by one or more adsorption processes.

Embodiment 144. The system of embodiment 125, wherein the shaped adsorbent particles of the batch of shaped adsorbent particles are further configured for desorption of the species from the surrounding medium subsequent to uptake and immobilization of the species.

Embodiments 145. The system of embodiment 43, wherein the shaped adsorbent particles are not configured for use as abrasive particles.

Embodiments 146. The system of embodiment 43, wherein the shaped adsorbent particles are not abrasive particles.

Embodiments 147. The system of embodiment 43, wherein the shaped adsorbent particles can not be configured for use in material removal through a grinding operation.

Embodiments 148. The system of embodiment 43, wherein the shaped adsorbent particles can not be configured for use in material removal through a grinding operation of a workpiece having a Vickers hardness of at least about 11 GPa, at least about 10 GPa, at least about 5 GPa.

Embodiments 149. The system of embodiment 43, wherein the shaped adsorbent particles have a hardness that not greater than a hardness of abrasive particles.

Embodiments 150. The system of embodiment 43, wherein the shaped adsorbent particles have a Mohs hardness that not greater than a Mohs hardness of abrasive particles.

Embodiments 151. The batch of shaped adsorbent particles of embodiment 27, wherein the shaped adsorbent particles have a Mohs hardness of not greater than about 7, not greater than about 6, not greater than about 5, not greater than about 4, not greater than about 3, not greater than about 2, not greater than about 1.

Embodiments 152. The system of embodiment 43, wherein the shaped adsorbent particles have a Vickers hardness that not greater than a Vickers hardness of abrasive particles.

Embodiments 153. The system of embodiment 43, wherein the shaped adsorbent particles have a Vickers hardness of not greater than about 11 GPa, not greater than about 10, not greater than about 5.

Embodiment 154. The method of embodiment 61, wherein the shaped lithium bayerite adsorbent particles of the batch of shaped lithium bayerite adsorbent particles are porous solid lithium bayerite particles configured for uptake and immobilization of a lithium-containing species from a surrounding medium by one or more adsorption processes.

Embodiment 155. The method of embodiment 154, wherein the shaped lithium bayerite adsorbent particles of the batch of shaped lithium bayerite adsorbent particles are further configured for desorption of the lithium-containing species from the surrounding medium subsequent to uptake and immobilization of the lithium-containing species.

Embodiment 156. The method of embodiment 61, wherein the shaped lithium bayerite adsorbent particles of the batch of shaped lithium bayerite adsorbent particles are porous solid lithium bayerite particles configured for selective uptake and immobilization of a lithium-containing species from a surrounding medium by one or more adsorption processes.

Embodiment 157. The method of embodiment 156, wherein the shaped lithium bayerite adsorbent particles of the batch of shaped lithium bayerite adsorbent particles are further configured for selective desorption of the lithium-containing species from the surrounding medium subsequent to uptake and immobilization of the lithium-containing species.

Embodiments 158. The method of embodiment 61, wherein the shaped lithium bayerite adsorbent particles of the batch of shaped lithium bayerite adsorbent particles are not configured for use as abrasive particles.

Embodiments 159. The method of embodiment 61, wherein the shaped lithium bayerite adsorbent particles of the batch of shaped lithium bayerite adsorbent particles are not abrasive particles.

Embodiments 160. The method of embodiment 61, wherein the shaped lithium bayerite adsorbent particles of the batch of shaped lithium bayerite adsorbent particles can not be configured for use in material removal through a grinding operation.

Embodiments 161. The method of embodiment 61, wherein the shaped lithium bayerite adsorbent particles of the batch of shaped lithium bayerite adsorbent particles can not be configured for use in material removal through a grinding operation of a workpiece having a Vickers hardness of at least about 11 GPa, at least about 10 GPa, at least about 5 GPa.

Embodiments 162. The method of embodiment 61, wherein the shaped lithium bayerite adsorbent particles of the batch of shaped lithium bayerite adsorbent particles have a hardness that not greater than a hardness of abrasive particles.

Embodiments 163. The method of embodiment 61, wherein the shaped lithium bayerite adsorbent particles of the batch of shaped lithium bayerite adsorbent particles have a Mohs hardness that not greater than a Mohs hardness of abrasive particles.

Embodiments 164. The method of embodiment 61, wherein the shaped lithium bayerite adsorbent particles of the batch of shaped lithium bayerite adsorbent particles have a Mohs hardness of not greater than about 7, not greater than about 6, not greater than about 5, not greater than about 4, not greater than about 3, not greater than about 2, not greater than about 1.

Embodiments 165. The method of embodiment 61, wherein the shaped lithium bayerite adsorbent particles of the batch of shaped lithium bayerite adsorbent particles have a Vickers hardness that not greater than a Vickers hardness of abrasive particles.

Embodiments 166. The method of embodiment 61, wherein the shaped lithium bayerite adsorbent particles of the batch of shaped lithium bayerite adsorbent particles have a Vickers hardness of not greater than about 11 GPa, not greater than about 10 GPa, not greater than about 5 GPa.

Embodiment 167. The batch of shaped lithium bayerite adsorbent particles of embodiment 87, wherein the shaped lithium bayerite adsorbent particles of the batch of shaped lithium bayerite adsorbent particles are porous solid lithium bayerite particles configured for uptake and immobilization of a lithium-containing species from a surrounding medium by one or more adsorption processes.

Embodiment 168. The batch of shaped lithium bayerite adsorbent particles of embodiment 167, wherein the shaped lithium bayerite adsorbent particles of the batch of shaped lithium bayerite adsorbent particles are further configured for desorption of the lithium-containing species from the surrounding medium subsequent to uptake and immobilization of the lithium-containing species.

Embodiment 169. The batch of shaped lithium bayerite adsorbent particles of embodiment 87, wherein the shaped lithium bayerite adsorbent particles of the batch of shaped lithium bayerite adsorbent particles are porous solid lithium bayerite particles configured for uptake and immobilization of a lithium-containing species from a surrounding medium by one or more adsorption processes.

Embodiment 170. The batch of shaped lithium bayerite adsorbent particles of embodiment 169, wherein the shaped lithium bayerite adsorbent particles of the batch of shaped lithium bayerite adsorbent particles are further configured for desorption of the lithium-containing species from the surrounding medium subsequent to uptake and immobilization of the lithium-containing species.

Embodiments 171. The batch of shaped lithium bayerite adsorbent particles of embodiment 87, wherein the shaped lithium bayerite adsorbent particles of the batch of shaped lithium bayerite adsorbent particles are not configured for use as abrasive particles.

Embodiments 172. The batch of shaped lithium bayerite adsorbent particles of embodiment 87, wherein the shaped lithium bayerite adsorbent particles of the batch of shaped lithium bayerite adsorbent particles are not abrasive particles.

Embodiments 173. The batch of shaped lithium bayerite adsorbent particles of embodiment 87, wherein the shaped lithium bayerite adsorbent particles of the batch of shaped lithium bayerite adsorbent particles can not be configured for use in material removal through a grinding operation.

Embodiments 174. The batch of shaped lithium bayerite adsorbent particles of embodiment 87, wherein the shaped lithium bayerite adsorbent particles of the batch of shaped lithium bayerite adsorbent particles can not be configured for use in material removal through a grinding operation of a workpiece having a Vickers hardness of at least about 11 GPa, at least about 10 GPa, at least about 5 GPa.

Embodiments 175. The batch of shaped lithium bayerite adsorbent particles of embodiment 87, wherein the shaped lithium bayerite adsorbent particles of the batch of shaped lithium bayerite adsorbent particles have a hardness that not greater than a hardness of abrasive particles.

Embodiments 176. The batch of shaped lithium bayerite adsorbent particles of embodiment 87, wherein the shaped lithium bayerite adsorbent particles of the batch of shaped lithium bayerite adsorbent particles have a Mohs hardness that not greater than a Mohs hardness of abrasive particles.

Embodiments 177. The batch of shaped lithium bayerite adsorbent particles of embodiment 87, wherein the shaped lithium bayerite adsorbent particles of the batch of shaped lithium bayerite adsorbent particles have a Mohs hardness of not greater than about 7, not greater than about 6, not greater than about 5, not greater than about 4, not greater than about 3, not greater than about 2, not greater than about 1.

Embodiments 178. The batch of shaped lithium bayerite adsorbent particles of embodiment 87, wherein the shaped lithium bayerite adsorbent particles of the batch of shaped lithium bayerite adsorbent particles have a Vickers hardness that not greater than a Vickers hardness of abrasive particles.

Embodiments 179. The batch of shaped lithium bayerite adsorbent particles of embodiment 87, wherein the shaped lithium bayerite adsorbent particles of the batch of shaped lithium bayerite adsorbent particles have a Vickers hardness of not greater than about 11 GPa, not greater than about 10 GPa, not greater than about 5 GPa.

Embodiment 180. The system of embodiment 103, wherein the shaped lithium bayerite adsorbent particles of the batch of shaped lithium bayerite adsorbent particles are porous solid lithium bayerite particles configured for uptake and immobilization of a lithium-containing species from a surrounding medium by one or more adsorption processes.

Embodiment 181. The system of embodiment 180, wherein the shaped lithium bayerite adsorbent particles of the batch of shaped lithium bayerite adsorbent particles are further configured for desorption of the lithium-containing species from the surrounding medium subsequent to uptake and immobilization of the lithium-containing species.

Embodiment 182. The system of embodiment 103, wherein the shaped lithium bayerite adsorbent particles of the batch of shaped lithium bayerite adsorbent particles are porous solid lithium bayerite particles configured for uptake and immobilization of a lithium-containing species from a surrounding medium by one or more adsorption processes.

Embodiment 183. The system of embodiment 182, wherein the shaped lithium bayerite adsorbent particles of the batch of shaped lithium bayerite adsorbent particles are further configured for desorption of the lithium-containing species from the surrounding medium subsequent to uptake and immobilization of the lithium-containing species.

Embodiments 184. The system of embodiment 103, wherein the shaped lithium bayerite adsorbent particles of the batch of shaped lithium bayerite adsorbent particles are not configured for use as abrasive particles.

Embodiments 185. The system of embodiment 103, wherein the shaped lithium bayerite adsorbent particles of the batch of shaped lithium bayerite adsorbent particles are not abrasive particles.

Embodiments 186. The system of embodiment 103, wherein the shaped lithium bayerite adsorbent particles of the batch of shaped lithium bayerite adsorbent particles can not be configured for use in material removal through a grinding operation.

Embodiments 187. The system of embodiment 103, wherein the shaped lithium bayerite adsorbent particles of the batch of shaped lithium bayerite adsorbent particles can not be configured for use in material removal through a grinding operation of a workpiece having a Vickers hardness of at least about 11 GPa, at least about 10 GPa, at least about 5 GPa.

Embodiments 188. The system of embodiment 103, wherein the shaped lithium bayerite adsorbent particles of the batch of shaped lithium bayerite adsorbent particles have a hardness that not greater than a hardness of abrasive particles.

Embodiments 189. The system of embodiment 103, wherein the shaped lithium bayerite adsorbent particles of the batch of shaped lithium bayerite adsorbent particles have a Mohs hardness that not greater than a Mohs hardness of abrasive particles.

Embodiments 190. The system of embodiment 103, wherein the shaped lithium bayerite adsorbent particles of the batch of shaped lithium bayerite adsorbent particles have a Mohs hardness of not greater than about 7, not greater than about 6, not greater than about 5, not greater than about 4, not greater than about 3, not greater than about 2, not greater than about 1.

Embodiments 191. The system of embodiment 103, wherein the shaped lithium bayerite adsorbent particles of the batch of shaped lithium bayerite adsorbent particles have a Vickers hardness that not greater than a Vickers hardness of abrasive particles.

Embodiments 192. The batch of shaped lithium bayerite adsorbent particles of embodiment 87, wherein the shaped lithium bayerite adsorbent particles of the batch of shaped lithium bayerite adsorbent particles have a Vickers hardness of not greater than about 11 GPa, not greater than about 10 GPa, not greater than about 5 GPa.

EXAMPLES

Example 1

Four sample batches of shaped lithium bayerite adsorbent particles S1-S3 were formed according to embodiments described herein. The sample batches of shaped lithium bayerite adsorbent particles S1-S3 were formed using a screen printing process according to embodiments described herein and using the parameters summarized in Table 1 below.

TABLE 1

| Process Parameters for Forming Adsorbent Particles S1-S3 | | |
|---|---|---|
| | | S1-S3 |
| Starting Material Process Conditions | Material Process Pressure Line Speed | Lithium bayerite gel Screen Printed and Dried 102 PSI 1.6 m/min |

A comparison batch of shaped lithium bayerite adsorbent particles CS1 formed according to conventional techniques was formed for comparison to the shaped lithium bayerite adsorbent particles S1-S3. The convention batch of shaped lithium bayerite adsorbent particles CS1 was formed using an extrusion process using the parameters summarized in Table 2 below.

TABLE 2

Process Parameters for Forming Adsorbent Particles CS1

| | | CS1 |
|---|---|---|
| Starting Material | Material | Lithium bayerite gel |
| Process Conditions | Process | Extrusion |

Both the sample batches of shaped lithium bayerite adsorbent particles S1-S3 and the comparison batch of shaped lithium bayerite adsorbent particles CS1 were measured to determine their composition and shape properties for comparison. Sample batch particle dimensions (length, width, and aspect ratio) were measured using images collected with an Olympus DSX510 digital optical microscope. Particles of a sample batch were placed on the microscope stage and distributed in a monolayer. For low aspect ratio samples (i.e., samples S1-S3), the height of the lens was adjusted to bring the particles oriented sideways (rather than face-up) into focus. For high aspect ratio samples (i.e., sample CS1), all pieces were naturally oriented in this position and they were brought into focus in the same way. The "Live Panorama tool" was used to stitch together a 9 frame by 9 frame image. Measurements of length and diameter were performed for at least 25 particles within the Olympus software or using Image J. For all low aspect ratio samples, a single line segment could be used to measure both length (L) and diameter (D). For high aspect ratio samples, multiple line segments were required to measure length for some pieces. Aspect ratio (AR) of a given particle was calculated by dividing length by diameter. The values of D(10,50,90), L(10,50,90), and AR(10,50,90) were determined by first fitting the data to Gaussian distributions using the "NORM.DIST" function in Microsoft Excel. The "NORM.INV" function in Microsoft Excel was then used to extract these values from the distributions.

TABLE 3

Finished Properties/Measurements for Batch Samples S1-S3 & CS1

| Properties/Measurement | S1 | S2 | S3 | CS1 |
|---|---|---|---|---|
| Moisture at 155° C. (wt. %) | 28.29 | 29.86 | 34.93 | 24.61 |
| Packing Density (g/cm$^3$) | 0.80 | 0.79 | 0.81 | 0.93 |
| Envelope Density (g/cm$^3$) | 1.17 | 1.29 | 1.18 | 1.55 |
| Packing Void Volume (%) | 31 | 39 | 31 | 40 |
| Diameter ($D_{10}$) (μm) | 1176 | 1188 | 1209 | 453 |
| Diameter ($D_{50}$) (μm) | 1236 | 1252 | 1257 | 483 |
| Diameter ($D_{90}$) (μm) | 1296 | 1316 | 1306 | 512 |
| PDDS (%) | 10 | 10 | 8 | 12 |
| Length ($L_{10}$) (μm) | 607 | 597 | 660 | 1675 |
| Length ($L_{50}$) (μm) | 672 | 652 | 709 | 2698 |
| Length ($L_{90}$) (μm) | 736 | 707 | 758 | 3721 |
| PLDS (%) | 19 | 17 | 14 | 76 |
| Aspect Ratio ($AR_{10}$) | 0.50 | 0.47 | 0.53 | 3.27 |
| Aspect Ratio ($AR_{50}$) | 0.54 | 0.52 | 0.56 | 5.64 |
| Aspect Ratio ($AR_{90}$) | 0.59 | 0.57 | 0.60 | 8.00 |
| PARDS (%) | 17 | 19 | 13 | 84 |

As shown in Table 3 above, the sample batches of shaped lithium bayerite adsorbent particles S1-S3 formed according to embodiments described herein had a much more consistent shape (i.e., a lower PARDS) as compared to the conventional batch of shaped lithium bayerite adsorbent particles CS1 formed using an extrusion process.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Moreover, not all of the activities described above in the general description or the examples are required, that a portion of a specific activity cannot be required, and that one or more further activities can be performed in addition to those described. Still further, the order in which activities are listed is not necessarily the order in which they are performed.

The disclosure is submitted with the understanding that it will not be used to limit the scope or meaning of the claims. In addition, in the foregoing disclosure, certain features that are, for clarity, described herein in the context of separate embodiments, can also be provided in combination in a single embodiment. Conversely, various features that are, for brevity, described in the context of a single embodiment, can also be provided separately or in any subcombination. Still, inventive subject matter can be directed to less than all features of any of the disclosed embodiments.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims. Thus, to the maximum extent allowed by law, the scope of the present invention is to be determined by the broadest permissible interpretation of the following claims and their equivalents, and shall not be restricted or limited by the foregoing detailed description.

What is claimed is:

1. A batch of shaped adsorbent particles comprising an average particle diameter of not greater than about 5.0 mm and a particle aspect ratio (L/D) distribution span PARDS of not greater than about 50%, where PARDS is equal to ($AR_{90}$-$AR_{10}$)/$AR_{50}$, where $AR_{90}$ is equal to the diameter at which 90% of said particles in said hatch of particles comprise a diameter less than said $AR_{90}$ diameter, $AR_{10}$ is equal to the diameter at which 10% of said particles in said batch of particles comprise a diameter less than said $AR_{10}$ diameter, and $AR_{50}$ is equal to the diameter at which 50% of said particles in said batch of particles comprise a diameter less than said $AR_{50}$ diameter.

2. The batch of shaped adsorbent particles of claim 1, wherein the batch of shaped adsorbent particles comprises (LiCl)$_x$.2Al(OH)$_3$, nH$_2$O, with n being between 0.01 and 10.

3. The batch of shaped adsorbent particles of claim 1, wherein the batch of shaped adsorbent particles comprises a moisture content of at least about 20 wt,% based on a total weight of the batch of adsorbent particle.

4. The batch of shaped adsorbent particles of claim 3, wherein the shaped adsorbent particles of the batch of shaped adsorbent particles are porous solid particles configured for uptake and immobilization of a species from a surrounding medium by one or more adsorption processes.

5. The batch of shaped adsorbent particles of claim 1, Wherein the batch of shaped adsorbent particles comprises an envelope density of at least about 0,9 g/cm$^3$ and not greater than about 2.0 g/cm$^3$.

6. The batch of shaped adsorbent particles of claim 1, wherein the batch of shaped adsorbent particles has an average particle length of at least about 0.1 mm.

7. A system for forming a batch of shaped adsorbent particles of claim 1, wherein the system comprises:
- an application zone comprising a shaping assembly including a first portion having an opening and configured to be filled with a precursor mixture to form a batch of precursor shaped adsorbent particles, and a second portion abutting the first portion;
- a drying zone comprising a first heat source and being configured to dry the batch of precursor shaped adsorbent particles to form the batch of shaped adsorbent particle; and
- an ejection zone comprising an ejection assembly configured to eject the batch of shaped adsorbent particles from the shaping assembly.

8. A method of forming a batch of shaped adsorbent particles of claim 1, wherein the method comprises:
- applying a precursor mixture into a shaping assembly within an application zone to form a batch of precursor shaped adsorbent particles;
- drying the batch of precursor shaped adsorbent particles within the shaping assembly to form the batch of shaped adsorbent particles; and
- ejecting the batch of shaped adsorbent particles from the shaping assembly, wherein the batch of shaped adsorbent particles comprises a moisture content of at least about 20 wt %.

9. The method of claim 8, wherein the precursor mixture comprises aluminas, boehmites, bayerites, aluminum hydroxides, silicas, titanias, zirconias, or any combination thereof.

10. The method of claim 8, wherein the batch of shaped adsorbent particles comprises a lithium aluminate.

11. The method of claim 8, wherein the shaped adsorbent particles of the batch of shaped adsorbent particles are porous solid particles configured for uptake and immobilization of a species from a surrounding medium by one or more adsorption processes.

12. The method of claim 8, wherein the batch of shaped adsorbent particles comprises an envelope density of at least about 0.9 g/cm$^3$ and not greater than about 2.0 g/cm$^3$.

13. The method of claim 8, wherein the batch of shaped adsorbent particles comprises a plurality of particles having a columnar shape.

* * * * *

UNITED STATES PATENT AND TRADEMARK OFFICE
CERTIFICATE OF CORRECTION

PATENT NO. : 11,666,885 B2
APPLICATION NO. : 16/856117
DATED : June 6, 2023
INVENTOR(S) : Samuel Noel Patrice Marlin et al.

Page 1 of 1

It is certified that error appears in the above-identified patent and that said Letters Patent is hereby corrected as shown below:

In the Claims

Column 46, Line 42, Claim 1, please delete "hatch" and insert --batch--.

Column 46, Line 54, Claim 3, please delete "20 wt,%" and insert --20 wt.%--.

Column 46, Line 63, Claim 5, please delete "0,9 g/cm$^3$" and insert --0.9 g/cm$^3$--.

Signed and Sealed this
Sixth Day of January, 2026

John A. Squires
*Director of the United States Patent and Trademark Office*